(12) United States Patent
Wallrich

(10) Patent No.: US 10,439,810 B2
(45) Date of Patent: Oct. 8, 2019

(54) DEVICE AND METHOD FOR ADMINISTERING A DIGITAL ESCROW SERVER

(71) Applicant: INRIA INSTITUT NATIONAL DE RECHERCHE EN INFORMATIQUE ET EN AUTOMATIQUE, Le Chesnay (FR)

(72) Inventor: Bertrand Wallrich, Battigny (FR)

(73) Assignee: INRIA INSTITUT NATIONAL DE RECHERCHE EN INFORMA . . ., Le Chesnay (FR)

( * ) Notice: Subject to any disclaimer, the term of this patent is extended or adjusted under 35 U.S.C. 154(b) by 198 days.

(21) Appl. No.: 15/554,988

(22) PCT Filed: Mar. 4, 2016

(86) PCT No.: PCT/FR2016/050503
§ 371 (c)(1),
(2) Date: Dec. 21, 2017

(87) PCT Pub. No.: WO2016/139435
PCT Pub. Date: Sep. 9, 2016

(65) Prior Publication Data
US 2018/0131513 A1    May 10, 2018

(30) Foreign Application Priority Data

Mar. 4, 2015 (FR) ..................... 15 51830

(51) Int. Cl.
*H04L 9/08* (2006.01)
*H04L 9/32* (2006.01)
*H04L 29/06* (2006.01)

(52) U.S. Cl.
CPC .......... *H04L 9/0894* (2013.01); *H04L 9/0825* (2013.01); *H04L 9/0869* (2013.01); *H04L 9/3252* (2013.01); *H04L 63/0428* (2013.01)

(58) Field of Classification Search
CPC combination set(s) only.
See application file for complete search history.

(56) References Cited

U.S. PATENT DOCUMENTS

| | | | |
|---|---|---|---|
| 6,237,097 B1* | 5/2001 | Frankel ............... | G06Q 20/382 713/180 |
| 2008/0013722 A1* | 1/2008 | Gentry ................. | H04L 9/0836 380/44 |
| 2015/0256348 A1* | 9/2015 | Tschache ............. | H04L 9/3066 713/158 |

OTHER PUBLICATIONS

Camenish et al. "An Identity Escrow Scheme with Appointed Verifiers", Crypto 2001, LNCS 2139, pp. 388-407, 2001.*

(Continued)

*Primary Examiner* — Piotr Poltorak
(74) *Attorney, Agent, or Firm* — Maynard, Cooper & Gale, P.C.; Brian Sattizahn

(57) ABSTRACT

An administration machine for a digital escrow server stores integer values each corresponding to a machine of a group of administration machines. An initialization function calls a polynomial function, unique to the administration machine, of a degree less than or equal to the number of administration machines, with each integer value, in order to obtain first secret values. The function constructs a message including, for each administration machine, the first secret value corresponding to the integer value of said machine. In response to a message having, for each administration machine, a second secret value obtained on calling the polynomial function of said machine on the integer value of the administration machine, the function constructs a resulting secret value from the first and second secret values. An overlay function processes a digital escrow using the result- (Continued)

ing secret value unique to the administration machine and resulting secret values unique to similar administration machines.

16 Claims, 12 Drawing Sheets

(56) References Cited

OTHER PUBLICATIONS

Stainislaw Jarecki, et al., "Probablistic Escrow of Financial Transactions with Cumulative Threshold Disclosure," Financial Cryptography and Data Security, 9th International Conference, FC 2005, Aug. 2, 2005, pp. 172-187.

Stainislaw Jarecki, et al., "Handcuffing Big Brother: an Abuse-Resilient Transaction Escrow Scheme," Advances in Cryptology, Eurocrypt 2004, pp. 590-608.

Zhenfu Cao, "A threshold key escrow scheme based on public key cryptosystem," Science in China Series E: Technological Sciences, 1 Aug. 2001, pp. 441-448.

\* cited by examiner

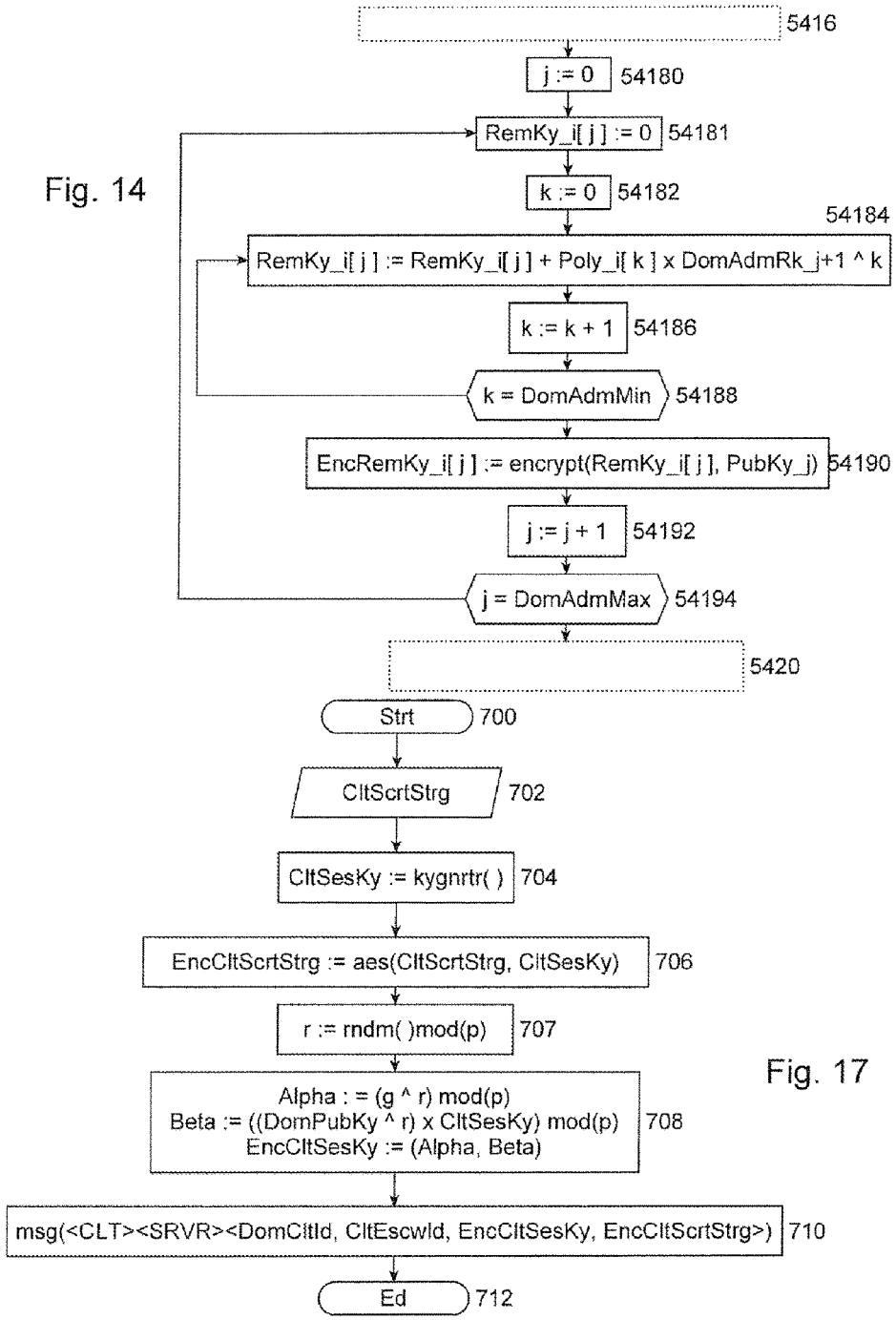

DEVICE AND METHOD FOR ADMINISTERING A DIGITAL ESCROW SERVER

The invention relates to computer security in general, and more particularly to the confidentiality of digital data.

To ensure the confidentiality of digital data, it is usual to encrypt them. Encrypted digital data are unusable as they are: they must first be decrypted.

Encryption consists in applying a cryptographic function to the digital data, by block or by messages, by using a particular value as a parameter. This particular value corresponds to what is called an encryption key in the art.

Subject to knowing the cryptographic function used, which is generally the case when the algorithms are public, it is necessary and sufficient to know the value of a decryption key for decrypting the digital data.

The value of this decryption key is such that it cannot easily be found. Generally a large key value is used, which makes it practically impossible to recover encrypted data without knowing the value of the key, in particular by successive attempts.

In the case of an asymmetric cryptographic function, the decryption key, usually referred to as a "private key", differs from the encryption key, which is then referred to as a "public key". It is sometimes said that these keys are asymmetric. In the case of a symmetric cryptographic function, the encryption key also allows decryption. Then it is said that the key is symmetric.

The confidentiality of the encrypted digital data rests on the ability to keep the decryption key secret. The value of the decryption key is kept secret by the recipient of the digital data, or disseminated in a strictly limited way to third parties authorized to access these data.

Decryption keys, and more generally all confidential digital data, can be kept securely by a trusted third party that restricts access thereto. This means in particular a digital escrow server, an escrow corresponding to an encrypted form of the confidential digital data.

The decryption key of a digital escrow can be kept secret by a single person. Generally, this means a recipient of the escrow, in particular the owner thereof or the administrator of the server. In this case, however, the escrowed data may be lost if the person in question is no longer able to indicate the value of the decryption key.

This generally proves quite critical since the encrypted data are sensitive and important data. Their availability for their owner, individual or company, is essential. As a result, the administrator of the escrow server must demonstrate unfailing availability.

The administrative function of an escrow server is sometimes provided by several persons, each of these persons having knowledge of the value of the decryption key. This prejudices the confidentiality of data: each administrator can decrypt an escrow. The risks regarding the confidentiality of the escrows are increased: the administrators of the escrow server are more frequently the target of computer attacks insofar as a successful attack may allow access to the data of several escrows.

Another practice consists in establishing a convention for generating the decryption key, making it possible to reconstitute same in case of loss. In fact, knowing the convention and the data necessary for the application of same is equivalent to knowing the key itself. A flaw is introduced into the security of the data, in that knowing the convention makes it possible to determine all the encryption keys complying with the convention.

Yet another practice consists in providing a recovery key for the encrypted data. An encryption algorithm is used such that the encrypted data may be decrypted either by the encryption key, kept by the user or by the recovery key, entrusted to a trusted third party.

In this case, however, each third party alone may recover the encrypted data. And the security flaws are multiplied due to the wider dissemination of the key values allowing the decryption of the data. In addition, the same recovery key value is often used for encryption keys corresponding to different users. And the period of validity of a recovery key is generally much longer than that of the user encryption keys.

One variant consists in sharing the decryption key between several trusted third parties: all key parts of the third parties must be brought together to obtain the recovery key. Security is greatly improved insofar as it is necessary to know and attack each of the third parties to hope to retrieve the encryption key. However, it comes down to a situation where the failure of a single person, in this case a trusted third party, prevents the recovery of the escrow.

One variant consists in sharing this recovery key between trusted third parties, according to a secret sharing algorithm, of the Shamir type, for example, or equivalent. The recovery key may be reconstructed by all of the third parties, or by a sub-set, also called a "quorum" of these third parties. However a vulnerability remains: once the recovery key is reconstructed, the same may be disclosed. There is then no longer any need of the quorum of administrators to have access to all of the encrypted data.

The invention will improve the situation.

An administration machine is provided for a digital escrow server comprising at least one communication interface, memory storing a list of integer values each corresponding to a respective machine of a group of administration machines of the digital escrow server, and a set of parameters relating to an encryption function for creating an escrow. The machine further comprises a calculator capable of executing a polynomial function of a degree less than or equal to the number of machines of the group of administration machines, the polynomial function being specific to the administration machine, an initialization function arranged for calling the polynomial function with each integer value of the list for obtaining an ordered list of first secret values, constructing at least one message comprising, for each homologous administration machine of the group of administration machines, at least the first secret value corresponding to the integer value of this homologous administration machine, in response to at least one message comprising, for each homologous administration machine of the group of administration machines, at least one second secret value obtained from calling the polynomial function of this homologous administration machine on the integer value of the administration machine, constructing a resulting secret value specific to the administration machine from the first and second secret values. The calculator is further capable of executing a recovery function arranged for processing at least one part of a digital escrow by using the resulting secret value specific to the administration machine and resulting secret values specific to the homologous administration machines of the group of administration machines.

The machine provided is capable of recovering an escrow by cooperating with the homologous machines of the group of administration machines, where necessary with only a subset of the machines of this group. "Recovering an escrow" designates the process which leads to decrypting this escrow without knowing the decryption key.

The escrow is recovered without reconstructing an optional decryption key. Each administration machine may recover the escrow once it has cooperated with a sufficient number of homologous administration machines.

The number of machines having to cooperate with a view to recovering an escrow is configurable.

During the recovery of an escrow, the machines of the group of administration machines operate similarly to each other. The machine provided and the homologous machines do not need to know each other. No master key is used, which considerably improves the security of the escrows.

Some decryption parameters of the escrows may be stored on the escrow server itself, e.g. encrypted with a key specific to each administration machine. In the event of corruption of the server, the confidentiality of the escrows remains assured, as well as the identity of the administrators and the means of decrypting the escrows.

A user may deposit an escrow. This user cannot recover their escrow themselves. This prevents any attack based on identity theft for the escrow. The escrow server does not have to maintain a partial or temporary key on disk or in RAM.

All the decryption operations are executed on the administration machine.

The secret value used for recovery is specific to the administration machine. It is partly defined by secret values relating to the other administration machines.

An infrastructure is also provided for exchanging and processing digital escrows comprising an escrow server and a group of administration machines comprising at least two administration machines of the type provided above for the escrow server, the two administration machines being homologous with each other.

A method for administering a digital escrow server is further provided comprising the following steps: on each machine of a group of administration machines, calling a respective polynomial function of a degree less than or equal to the number of machines of the group of administration machines with each value of a list of integer values each corresponding to a respective machine of the group of administration machines for obtaining a list of secret values; on each machine of the group of administration machines, constructing at least one message comprising at least one secret value corresponding to the integer value of a recipient administration machine; on each machine of the group of administration machines, constructing a resulting secret value specific to this machine from the secret values calculated, by the other machines of the group of administration machines, for the integer value corresponding to the administration machine; on at least some of the machines of the group of administration machines, decrypting a digital escrow by using this resulting secret value and the resulting secret values of homologous administration machines.

Finally, a computer program product is provided capable of cooperating with a central computer unit for forming an administration machine of the type provided above.

Other features and advantages of the invention will emerge on examining the detailed description below, and the appended drawings in which:

FIG. 14 represents a flowchart which details a step in FIG. 13.

FIG. 17 represents a flowchart illustrating the operation of a client machine corresponding to the second operational mode of an escrow domain;

The appended drawings contain elements of a certain character and may accordingly not only serve to complete the invention, but also contribute to the definition thereof, where necessary.

Figure 1:
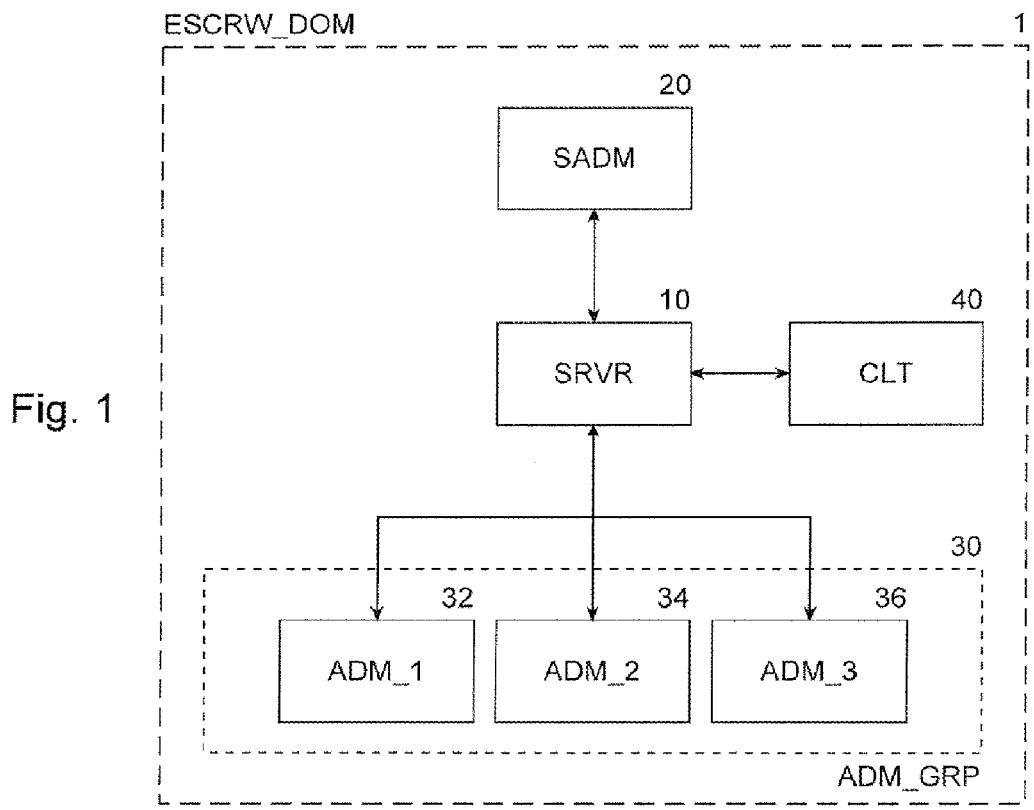
FIG. 1 represents a functional diagram illustrating an escrow domain.

FIG. 1 depicts a computer infrastructure for exchanging and processing digital escrows organized in a domain 1. Here, the domain 1 is further organized so as to store digital escrows.

In general, a "digital escrow" or "escrow" for short, corresponds to an encrypted form of a series of bytes of any size stored, or intended to be stored, securely on a third machine. The original series of bytes is sometimes designated a "secret" in the art. A secret may, for example, correspond to a character string, a number, a series of numbers, a computer file or a list of files.

The domain 1 is organized on a computer network, hardware and software, infrastructure. The basic network comprises machines, hardware and software elements of the network, capable of communicating with each other according to any network protocol, e.g. on the basis of a socket, Hypertext Transfer Protocol, or HTTP protocol, optionally in the secure version (https protocol) or "Remote Procedure Call" (RPC) protocol, or more generally any structured data exchange protocol.

The machines of the domain 1 communicate with each other according to a protocol for exchanging data between the machines of the domain 1. The protocol may be encoded in any manner as long as the machines of the domain 1 can exchange data with each other, e.g. in ASN.1, JSON or XML.

The escrow domain 1 comprises an escrow server 10 which, both stores the digital escrows, and at least partly controls the domain 1. The server 10 may be distributed over multiple machines, hardware and/or software. In particular, the server 10 may comprise a first machine dedicated to the storage of the digital escrows and a second, different machine dedicated to controlling the domain 1.

The domain 1 further comprises a higher level administration machine or upper administration machine 20, capable of communicating with the server 10. The upper administration machine 20 controls the server 10.

The domain 1 further comprises a group of administration machines 30, here comprising a first administration machine 32, a second administration machine 34 and a third administration machine 36. Each machine of the group 30 is capable of communicating. The machines of the group 30 act on the digital escrows.

The domain 1 finally comprises one or more client machines 40 which are each capable of communicating with the server 10, in particular in order to deposit one or more digital escrows therein.

Figure 2:
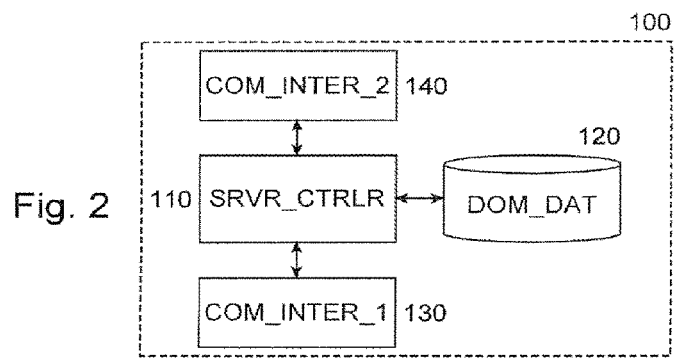
FIG. 2 represents a functional diagram illustrating a server module for an escrow domain.

FIG. 2 depicts a server module 100 for use, for example, for the server 10 in FIG. 1.

The server module 100 comprises a main controller 110 and a data storage structure 120. The controller 110 is capable of reading, writing and processing data in the storage structure 120. The structure of this storage 120 holds in particular a set of management data relating to the escrow domain, including data relating to the parameterization of the escrow.

The server module 100 further comprises at least one first communication interface 130 which may be controlled by the controller 110 for communicating with the machines of an escrow domain, e.g. the domain 1 in FIG. 1.

Here, the server module 100 further comprises a second communication interface 140 which may be controlled by the controller 110 for exchanging data exclusively with a digital escrow storage machine. In particular, the controller 110 is capable of transmitting to the second interface 140 one or more messages comprising digital escrows intended to be stored on the machine in question.

The escrow storage machine may be arranged for periodically connecting to the controller 110 via the second communication interface 140 in order to retrieve requests from the waiting server module 100 and to transmit to this module responses to the requests relating to the preceding connection. In this configuration, the escrow storage machine corresponds to what is most often termed a "cold server".

The server module 100 may be implemented in the form of a web software server provided with JSON ("Java Script Object Notation") type libraries executed by a central computer unit. The storage structure 120 may be organized in the storage memory of the computer in question.

Figure 3:
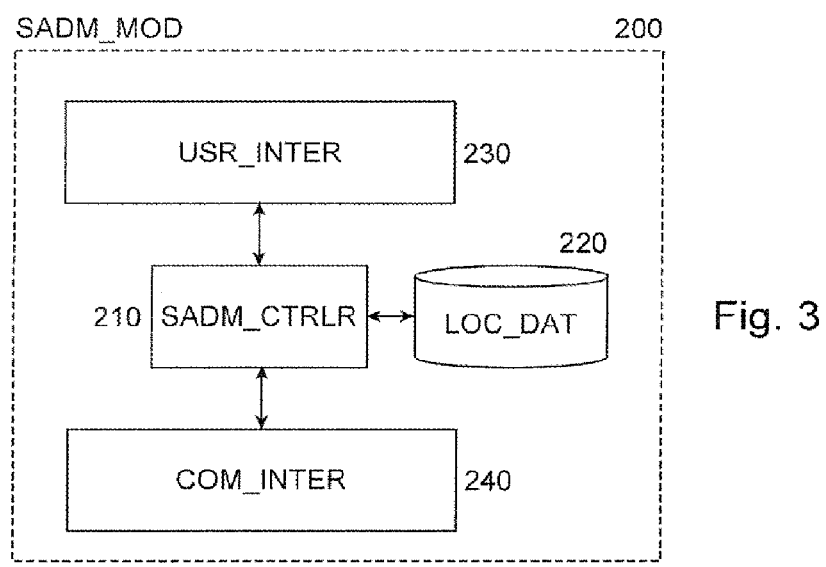
FIG. 3 represents a functional diagram illustrating a higher level administrator module for an escrow domain.

FIG. 3 depicts a super administrator module 200 for use, for example, in the super administrator machine 20 in FIG. 1.

The super administrator module comprises a main controller 210 and a storage structure 220 that stores the data in memory relating to the super administrator function.

The controller 210 can read, write and process the data in the storage structure 220.

The super administrator module 200 further comprises a user interface 230, e.g. of the graphical type, which interacts with the main controller 210.

The administrator module further comprises a communication interface 220 which may be controlled by the main controller 210 for transmitting and receiving data through an escrow domain, e.g. the domain 1 in FIG. 1.

The super administrator module 200 may take the form of a Java application that is executed on a central computer unit. The storage structure 220 may be organized in the storage memory of the computer in question.

Figure 4:
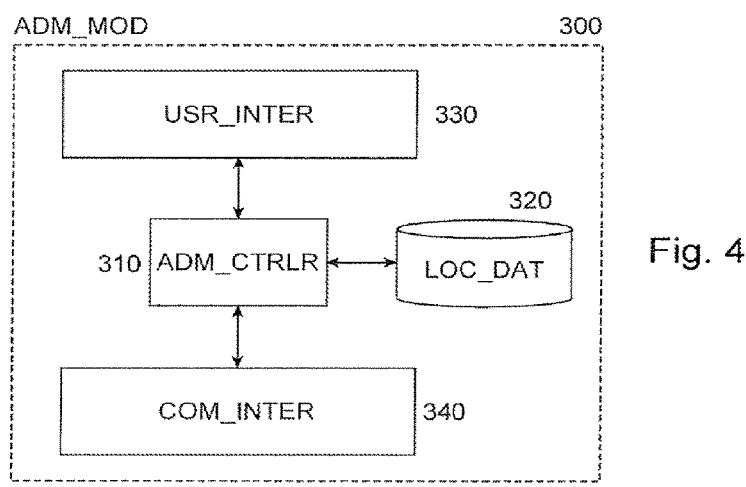
FIG. 4 represents a functional diagram illustrating an administrator module for an escrow domain.

FIG. 4 depicts an administrator module which may be used in an administration machine, e.g. each of the first machine 32, the second machine 34 and the third machine 36 of the administration group 30 in FIG. 1.

The administration module 300 comprises a main controller 310 and a data storage structure 320 with which the controller may interact, in particular, for reading, writing and processing data.

The administrator module comprises a user interface capable of interacting with the main controller 310. For example, the user interface is of a graphical type.

The administrator module 300 further comprises a communication interface 340 which may be controlled by the main controller 310 for exchanging data through an escrow infrastructure, e.g. the domain 1 in FIG. 1.

The administrator module may be implemented in the form of a Java application that is executed on a central computer unit. The storage structure 320 may be organized in a storage memory of this central unit.

Figure 5:
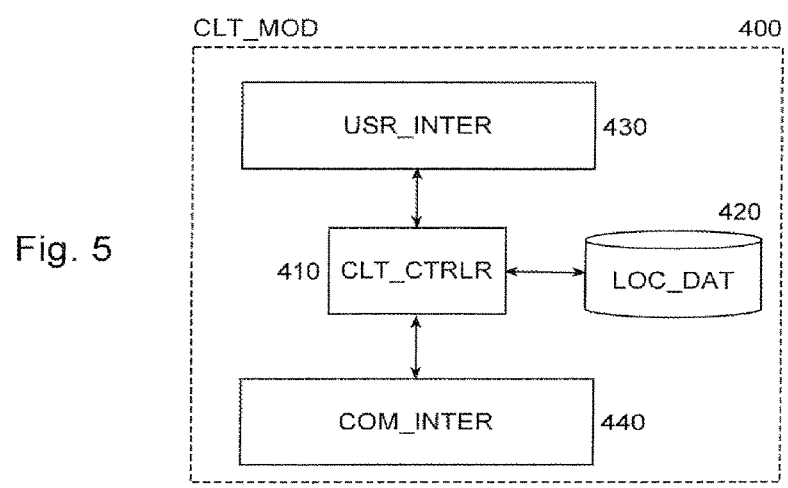
FIG. 5 represents a functional diagram illustrating a client module for an escrow domain.

FIG. 5 depicts a client module 400 for use, for example, in the client machine 40 of the domain 1 in FIG. 1.

The client module 400 comprises a controller 430 and a data storage structure 440 with which the main controller 410 may interact for reading, writing and storing data.

The client module 400 further comprises a user interface 430 which interacts with the main controller 410. The user interface 430 may be of a graphical type.

The client module 400 further comprises a communication interface 440 which may be controlled by the main controller 410 for exchanging data through an escrow infrastructure, in particular, the domain 1 in FIG. 1.

The client module 400 may be implemented in the form of a Java application executed on a central computer unit. The storage structure 420 may be organized in the storage memory of this computing unit.

In one embodiment, some at least of the server 100, super administrator 200, administrator 300 and client 400 modules are integrated into the same, e.g. Java, application that is executed on a machine like a particular module according to the rights associated in the domain with an identifier of the user of the machine in question.

Figure 6:
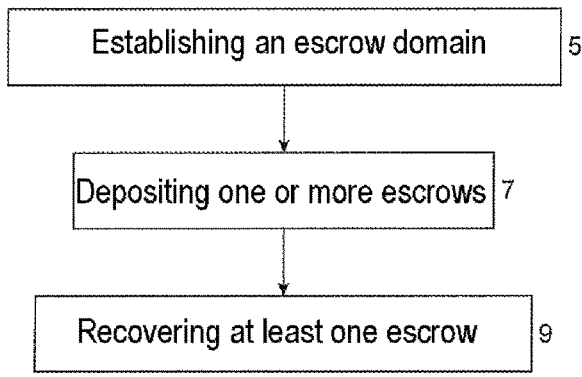
FIG. 6 represents a flowchart illustrating successive operational modes of an escrow domain.

FIG. 6 generally illustrates different operational modes of a digital escrow infrastructure, in particular the domain 1 in FIG. 1.

According to a first operational mode, illustrated by block 5, at least some of the software and hardware elements of a computer network infrastructure cooperate with a view to establishing an escrow domain.

According to a second operational mode, illustrated by block 7, at least some of the software and hardware elements of the infrastructure cooperate in order to allow recording an escrow on an infrastructure server, e.g. the server 10 in FIG. 1.

According to a third operational mode, illustrated by block 9, some at least of the hardware and software elements of the infrastructure cooperate with a view to recovering at least one of the escrows stored on the infrastructure server, i.e. to allow the decryption of the digital escrow in the absence of at least some of the data used for the encryption of the digital escrow in question.

Figure 7:
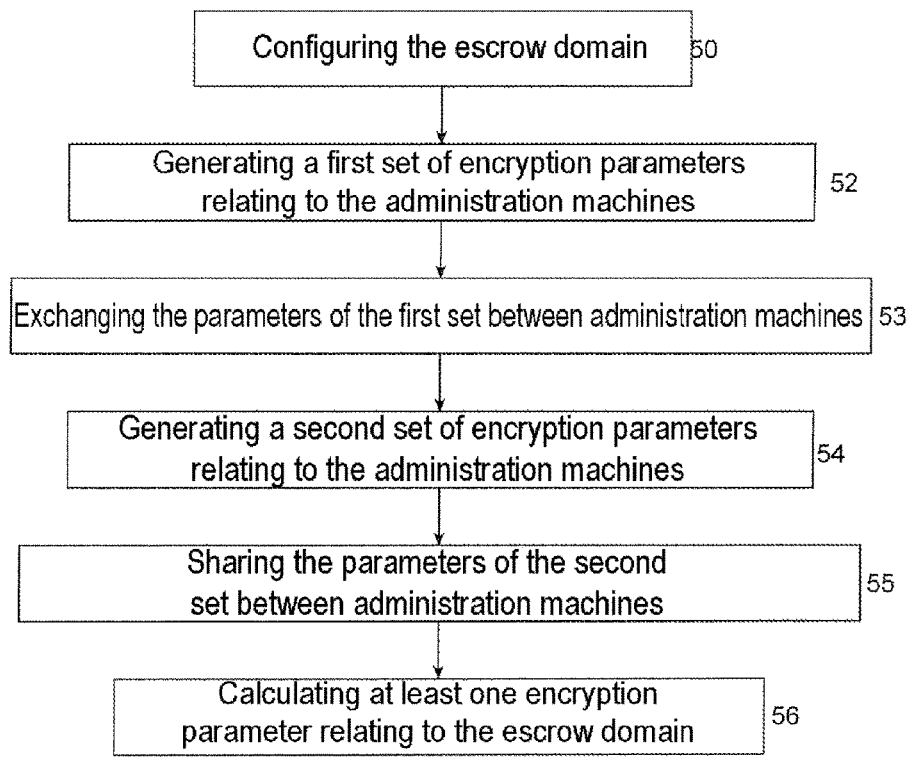
FIG. 7 represents a flowchart illustrating the establishment of an escrow domain.
Figure 8:
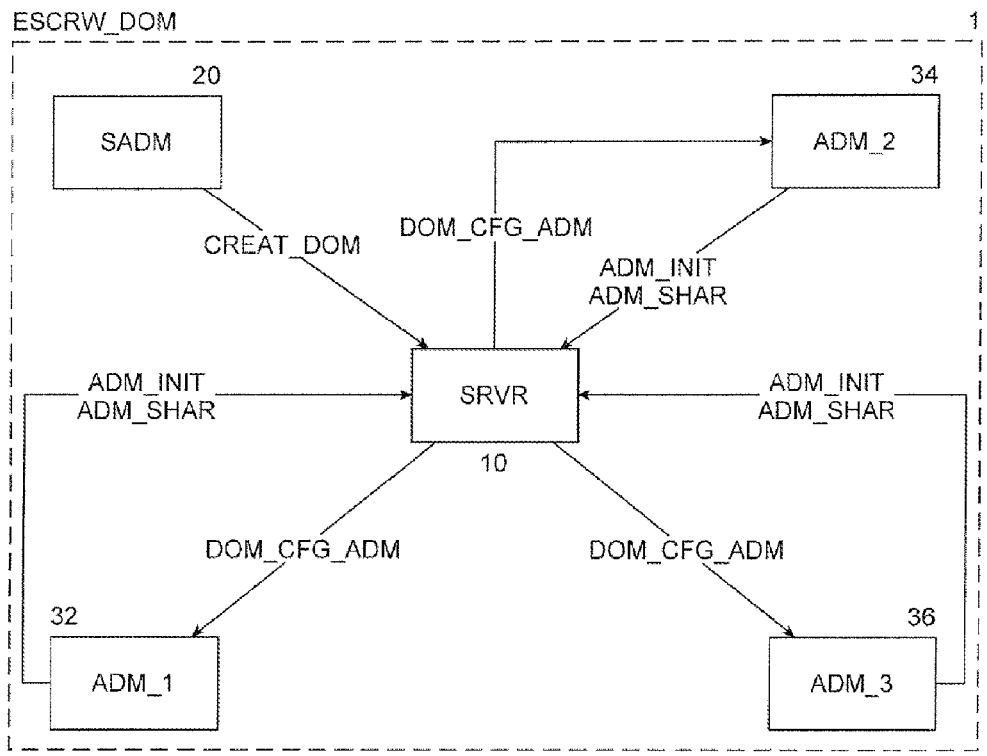
FIG. 8 represents the domain in FIG. 1 in a first operational mode.

FIGS. 7 and 8 detail the setting up of an escrow infrastructure such as the domain 1 in FIG. 1, for example.

The establishment of the infrastructure starts with a configuration phase, represented here by block 50. This means in particular setting at least some of the parameters required for the operation of the infrastructure, at least in an initial phase. This involves at least defining, from among the hardware and software elements of an infrastructure network, an infrastructure controller, an escrow storage server, optionally assembled in a single machine, and a group of administration machines for the escrows. This definition may involve a user intervention.

The configuration of the escrow infrastructure may be performed from a particular machine of the network infrastructure, such as a higher level administration machine, e.g. the machine 20 in FIG. 8. Data relating to the configuration of the infrastructure are held on the controller, that the administration machines can access. In the example of FIG. 8, these data are held on the escrow server 10, e.g. in a structure similar to the storage structure 120 in FIG. 2.

The configuration data of the escrow infrastructure may be transmitted to the escrow controller by the higher level administration machine in a specific domain creation message, or CREAT_DOM message, as this is illustrated in FIG. 8.

The establishment of the escrow infrastructure continues with generating cryptographic parameters for use in the infrastructure, which corresponds to block 52 in FIG. 7, and by sharing these parameters between at least some of the infrastructure machines, which corresponds to block 53 in FIG. 7.

Each administration machine, e.g. each machine of the group 30 in FIG. 1, generates a first set of cryptographic parameters which is specific thereto. Then the cryptographic parameters of the first set of administration machines are shared between the homologous machines of the group of administration machines. These parameters may be shared via the infrastructure controller, which avoids the administration machines having to communicate directly with each other. For example, each administration machine transmits the data of its first set of cryptographic parameters to the controller, with the aid of an initialization message. In FIG. 8, for example, each of a first administrator station 32, a second administrator station 34 and a third administrator station 36 sends to the server 10 an administrator initialization message, or ADM_INIT message.

The controller of the escrow infrastructure stores the cryptographic parameters received from the administration machines in a collection of first cryptographic parameters, relating to the group of administration machines, then places this collection at the disposal of these administration machines.

In the embodiment illustrated in FIG. 8, each of the first administration machine 32, the second administration machine 34 and the third administration machine 36 receives from the server 10 a message containing administrative configuration data of the domain 1, or a DOM_CFG_ADM message. These data comprise a collection of first cryptographic parameters.

Each administration machine stores the collection of first cryptographic parameters. Each administration machine generates a second set of cryptographic parameters from the collection of first cryptographic parameters. This corresponds to block 54 in FIG. 7. The second set of cryptographic parameters comprises cryptographic data specific to the administration machine which has generated same and cryptographic data for use more generally by other machines of the infrastructure, in particular other administration machines.

The parameters of the second set are then shared between the administration machines. This corresponds to block 55 in FIG. 7. Sharing may be take place via the escrow controller. In FIG. 8, for example, each administration machine transmits to the server a data sharing message, or ADM_SHAR message, which contains the data of the second set of parameters thereof.

The establishment of the escrow infrastructure ends with calculating cryptographic parameters for use in this infrastructure, in particular for depositing an escrow, from the collection of cryptographic parameters. This corresponds to block 56 in FIG. 7. The cryptographic parameters in question comprise in particular a valid public key for the escrow infrastructure. This public key may be made available to infrastructure machines on an infrastructure server, typically the escrow server or the controller. This public key may be used for encrypting digital data with a view to creating an escrow.

Figure 9:
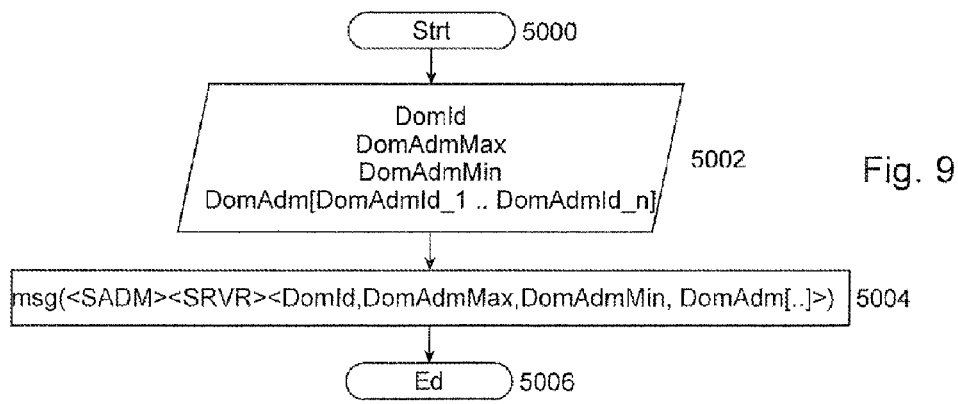
FIG. 9 represents a flowchart illustrating the operation of a higher level administration machine corresponding to a first operational mode of an escrow domain.

FIG. 9 illustrates a first main function for an upper level administration machine, e.g. the machine 20 in FIG. 8, for use in the first operational mode of an escrow infrastructure. It may be, for example, the operation of the main controller 210 in FIG. 3.

The function starts in a step 5000.

In the next step 5002, the function receives an identifier for the escrow infrastructure, or identifier DomId, e.g. in the form of a character string, a total number of administration machines for the infrastructure, or number DomAdmMax, a minimum number of administration machines required for recovering an escrow, or number DomAdmMin, and an identifier for each administration machine of the infrastructure, denoted generically by DomAdm_i for an i-th machine, e.g. in the form of a character string. These data are stored in memory, e.g. in a structure similar to the storage structure 220 in FIG. 3. The identifiers DomAdm_i may be stored in an array of size n, where the number n corresponds to the number DomAdmMax. Here it is the array DomAdm. These values may be entered from the higher level administration machine, in particular through an interface similar to the interface 230 in FIG. 3.

In the next step 5004, the function constructs an infrastructure creation message, e.g. a CREAT_DOM message, comprising an identifier of the host machine, here the identifier SAdmId, as the issuer, and the identifier of an infrastructure controller as the recipient, or identifier SRVRId. The message contains data consisting of the string DomId, the number DomAdmMax and the number DomAdmMin, as well as an array of the DomAdm type, each element of which corresponds to the identifier of an administration machine of the infrastructure, or similar.

The function then ends at step 5006.

Figure 10:
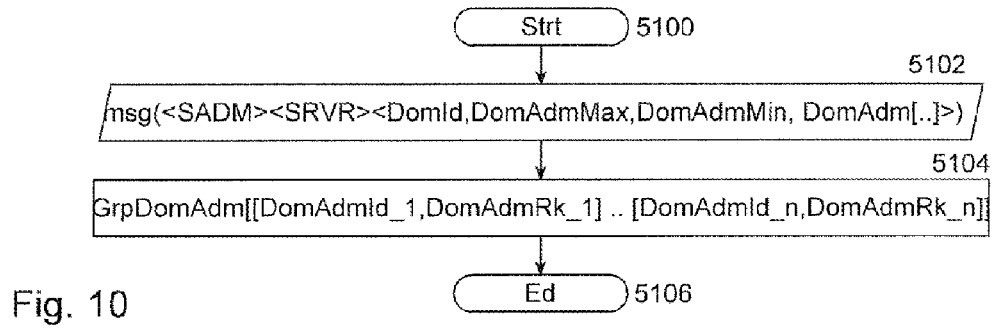
FIG. 10 represents a flowchart illustrating the operation of an escrow server corresponding to the first operational mode of an escrow domain.

FIG. 10 illustrates a first main function for a controller, e.g. the server 10 in FIG. 8, in the first operational mode of an escrow infrastructure. This is, for example, the operation of the controller 110 in FIG. 2.

The function starts in 5100.

In the next step 5102, the function receives a domain creation message from an upper level administration machine, e.g. a CREAT_DOM message. The message comprises a domain identifier, e.g. the string DomId, a number of administration machines, e.g. the number DomAdmMax, a minimum number of administration machines e.g. the number DomAdmMin, and a list of identifiers of administration machines, e.g. the array DomAdm.

In the next step 5104, the function stores the received data locally. The function stores the identifier of each administration machine, denoted generically by DomAdm_i, in relation to a respective integer (non-zero) value, denoted generically by the value DomAdmRk_i.

For example, the function fills an array relating to the group of administration machines, here an array DomAdmGr, each element of which comprises an identifier DomAdm_i, in relation to a value DomAdmRk_i. The value DomAdmRk_i may correspond to an index value of the identifier DomAdm_i in the array DomAdmGr. This index may correspond to the order in which the administration machine has received the user identifiers. A random sequencing may also be implemented. In addition or in replacement, the integer values may be randomly generated.

The function ends in a step 5106.

Figure 11:
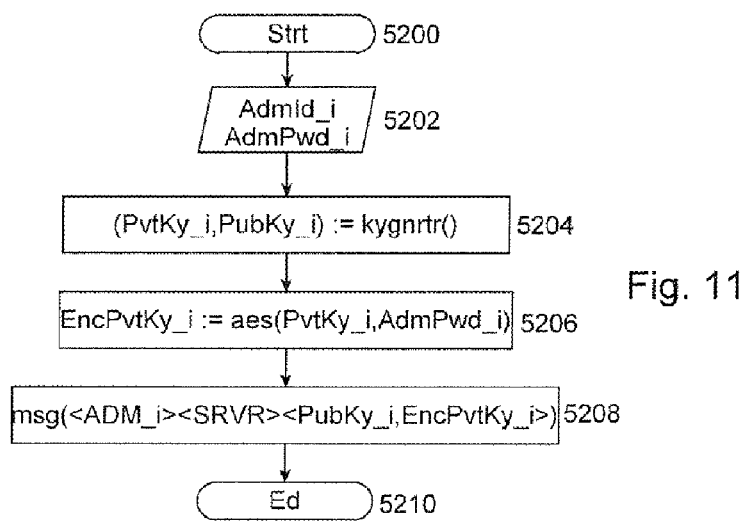
FIG. 11 represents a flowchart illustrating the operation of an administration machine corresponding to the first operational mode of an escrow domain.

FIG. 11 illustrates a first function for an administration machine, e.g. the main function 310 of the administration module 300 in FIG. 4, corresponding to the first operational mode of an infrastructure of the domain. This first function is intended for generating a first set of cryptographic data.

The function starts in 5200.

In the next step, 5202, the function receives the identifier DomAdmId_i of an administration machine i. Here, the function further receives a code the value of which determines access to this machine i. The code is, for example, a password, that is generically denoted by DomAdmPwd_i, e.g. in the form of a character string, where appropriate chosen by or for a user of the machine i.

In the next step 5204, the function generates a pair of values corresponding to a public key, or key PubKy, and a private key, or key PvtKy, of an asymmetric type of encryption function. The key PvtKy and the key PubKy are generated randomly on the machine i and are specific to this machine i. The asymmetric encryption function may be of the RSA or ElGamal type, for example. For example, the function randomly generates a whole number in an interval [1 . . . p0−2], where p0 is an integer value that corresponds to a parameter common to the machines of the escrow infrastructure. The generated value is used as the key PvtKy. The function then calculates the key PubKy with the aid of a generating value g0, comprised within the interval [1 . . . p0−2], raised to the power PvtKy and brought back into the interval [1 . . . p0 2] (modulo p0). The generating value g0 may be common to the escrow infrastructure. For example, the values of the parameters p0 and g0 may be encoded in the function in order to avoid exchanging these values between infrastructure machines. Thus the security of the escrow infrastructure is improved. As a variant, the values of the parameters p0 and g0 may be specific to each administration machine. In this case, these values are communicated to the homologous machines of the group of administration machines.

In the next step 5206, the key PvtKy is encrypted by means of a symmetric type function, e.g. of the AES type, with a code specific to the machine i as a parameter, e.g. the string DomAdmPwd_i. An encrypted value of the key PvtKy, or the value EncPvtKy, is obtained. The key PvtKy, the key PubKy and the value EncPvtKy are specific to the machine i.

At the next step 5208, the function constructs a message to a controller of the infrastructure, e.g. the server 10 in FIG. 8, by indicating the identifier of the administration machine DomAdm_i as the issuer. The message comprises the data corresponding to the key PubKy_i generated on the machine i and to the value EncPvtKy_i encrypted for the machine i. This is, for example, an ADM_INIT message in FIG. 8.

The function then ends in 5210.

Figure 12:
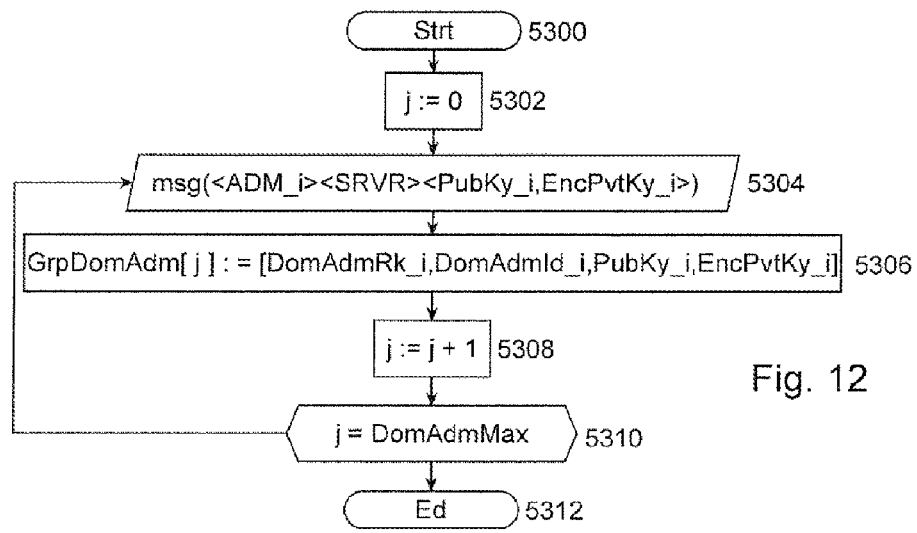
FIG. 12 is similar to FIG. 10.

FIG. 12 illustrates a second function for a controller, e.g. the server 10 in FIG. 8, for use in the first operational mode of an escrow infrastructure. This is, for example, the operation of the main controller 210 in FIG. 3.

The function starts in 5300.

In the next step 5302, the function starts a loop structure by initializing a counter j.

In the next step, 5304, the function receives a message from an administration machine i of the infrastructure. The message comprises two values corresponding respectively to a public key value specific to the machine i, here the key PubKy_i, and to an encrypted value for this machine i of a private key specific to the machine i, here the value EncPvtKy_i. This is, for example, an ADM_INIT message.

In the next step 5306, the function stores the data of the preceding step. Here the data are assembled as an element of index j of an array GrpDomAdm. The function adds to the received data the integer value DomAdmRk_i of the administration machine i.

In the next step 5308, the counter j is incremented.

In the next step 5310, the function checks that the counter j has reached its final value. This value corresponds to the number DomAdmMax. The function checks that it has received and processed an initialization message from each of the administration machines of the escrow infrastructure.

If so, then the function ends at the next step 5312. Otherwise, the function returns to step 5304 where it waits for an initialization message from another administration machine.

Steps 5300 through 5312 correspond to storing, on the controller of the escrow infrastructure, cryptographic data for securely exchanging data between administration machines, directly or via the controller. These cryptographic data comprise, for each administration machine, a respective value for use as a public key. Here, these cryptographic data further comprise an encrypted value, for the machine in question, of the private key corresponding to the public key. The latter may become optional, insofar as at least some of the administration machines may keep their private key without sending it to the controller or to the homologous administration machines.

Figure 13:
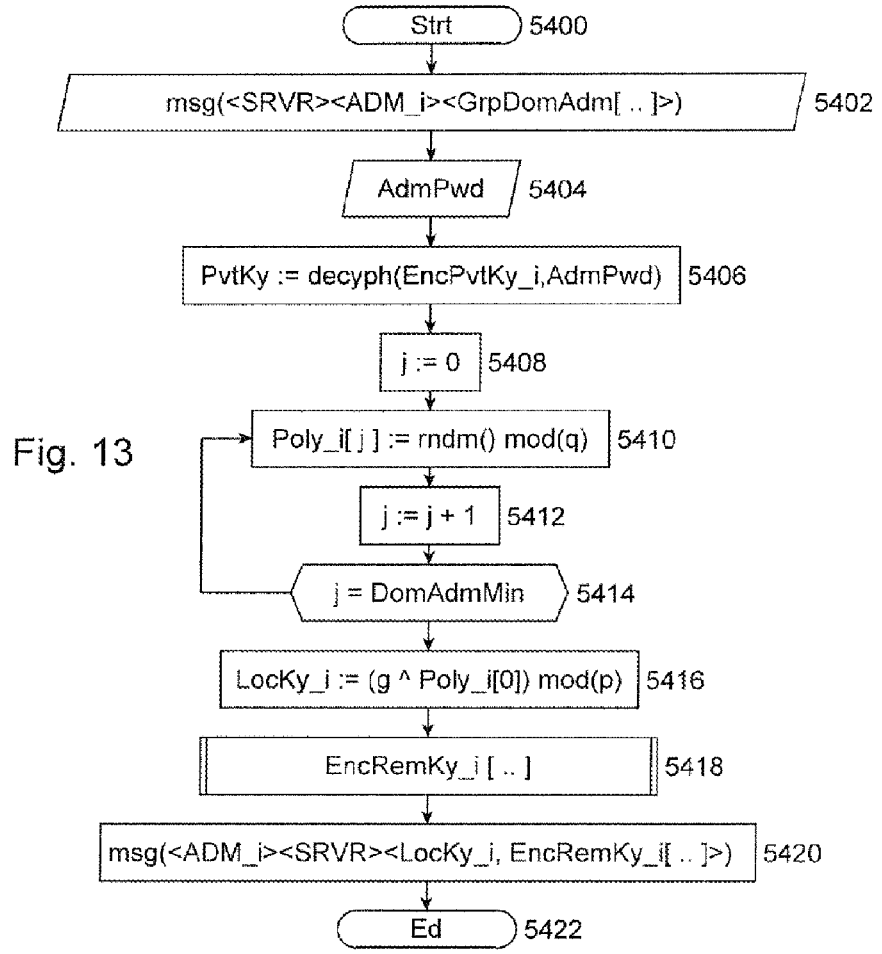
FIG. 13 is similar to FIG. 11.

FIG. 13 illustrates a second main function for an administration machine, e.g. one of the first 32, second 34 and third 36 administration machines in FIG. 8, corresponding to the first operational mode of an escrow infrastructure. This second function corresponds to the exchange of parameters of a first set of cryptographic parameters between administration machines. This is, for example, the operation of the main controller 310 in FIG. 4.

The function starts in a step 5400.

In the next step, 5402, the function receives a message from a controller of the infrastructure comprising data relating to each administration machine i of the escrow infrastructure. In particular, the data comprise, for each administration machine i, a machine identifier, e.g. the identifier DomAdmId_i, a public key value specific to this machine i, e.g. the key PubKy_i, an encrypted value for this machine i of a private key generated by this machine i, e.g. the key value EncPvtKy_i, and a rank DomAdmRk_i of this machine. The data may be assembled in an array similar to the array GrpDomAdm.

In the next step 5404, the function receives a code which determines access to the machine, e.g. the string DomAdmPwd.

This makes it possible, in the next step 5406, to decrypt the value EncPvtKy_i corresponding to the machine i. The key PvtKy_i is obtained relating to this machine i.

Steps 5400 through 5406 correspond to the retrieval, by a particular administration machine, of the data of the first set of cryptographic parameters thereof, in particular its public key value and an encrypted version of its private key value. This makes it possible to use physically different devices as an administration machine i between steps 52 and 54. This further avoids the machine i storing cryptographic data on a device, which greatly improves security. However, these steps are optional insofar as these cryptographic data may be securely stored on a particular device.

In the following steps, the function generates data defining a polynomial of a degree corresponding to the number DomAdmMin less one. The coefficients of the polynomial are generated randomly in a discrete integer space the dimension of which, here represented by the integer q, is common to the administration machines of the escrow infrastructure. The polynomial is specific to the machine that generated it. The homologous machines of the group of administration machines do not necessarily use the same polynomial.

This is done by first initializing a loop counter j to a zero value in a step 5408.

In the next step 5410, the function stores as an element of index j of an array Poly_i the result of a random generation function with values in an interval [1 ... q−2].

The counter j is incremented in the next step 5412. In the next step 5414, the function checks that the counter j has reached its final value, i.e. the number DomAdmMin. The function checks that a coefficient has been generated for each term of the polynomial.

If so, then the function continues to the next step 5416. Otherwise, the function returns to step 5410 where it generates a value for the higher degree coefficient and then stores it in the array Poly_i.

In step 5416, a local public key value is calculated specific to the administration machine i, or key LocKy_i, from the data of the array Poly_i. Here an encryption function of the ElGamal type is used. The key LocKy_i is calculated with the generating value g of the infrastructure, in the interval [1 ... p−2], by using the zero degree term of the polynomial, here the zero index integer of the array Poly_i. The value LocKy_i is specific to the administration machine i considered.

In the next step 5418, the function calculates a collection of secret values relating to the other administration machines of the domain. A secret value for a generic administration machine k is encrypted with the key PubKy_k of this administration machine, e.g. as it has been received in step 5402. The encrypted secret values are assembled here in an array EncRemKy_i. For example, the secret value for the administration machine k is stored as an element of index k−1 in this array.

In the next step 5420, the function constructs a message to the server intended for sharing the cryptographic data, or message ADM_SHAR. The message in question comprises the value of the local key LocKy_i of the host machine i and an array of secret values, if necessary encrypted, corresponding to the array EncRemKy_i.

The function then ends at the next step 5422.

Encrypting the secret values makes it possible to ensure their confidentiality. In other words, only the administration machine may access the secret calculated for it by the administration machine i. This makes it possible to confidentially assemble the secret values on an infrastructure server. However, encryption may become optional in the case where the secret's confidentiality can be ensured in another way, e.g. in the context of an exchange of secret values directly between administration machines.

FIG. 14 details step 5418 in FIG. 13.

In a step 54180, the function starts a loop structure by initializing a first counter j to the value 0 (zero).

In the next step 54181, function creates a calculation array RemKy_i and initializes the element of index j in this array to the value 0 (zero).

In the next step 54182, the function starts a second loop structure, nested in the first, by initializing a second counter k to the value 0 (zero).

In the next step 54184, the function stores in the calculation array RemKy_i, as an element of index j, the value corresponding to this index j to which is added the coefficient of degree k of the signature polynomial, i.e. the integer value of index k in the array Poly_i, that is multiplied by the rank of the administration machine j+1, or DomAdmRkJ+1 to the power k.

In the next step 54186, the function increments the loop counter k, before checking, in step S4188 that this loop counter k reached its final value, corresponding to the number DomAdmMin.

If so, then the function continues to the next step 54190. Otherwise, the function returns to step 54184.

Steps 54182 through 54188 correspond to the calculation of a result value of the polynomial function which acts as a signature function to the administration machine i for a particular value. This particular value corresponds to the integer value DomAdmRk_j of an administration machine j of the infrastructure. The result value is generated on a particular administration machine, on the basis of a function specific to this machine. This value may be seen as a signature value. The result value is also a secret value. This result value is calculated on the basis of an integer value corresponding univocally to a homologous machine of the group of administration machines. It may be seen as a part of a secret value specific to this homologous machine.

In step 54190, the function encrypts the secret value corresponding to an administration machine j, e.g. the value of index j in the array of key RemKy_i, with the key PubKy_j of this machine j. The encryption here uses an ElGamal type of function, the parameters of which are common to the administration machines of the escrow infrastructure, e.g. the parameters g_0 and p_0 described in relation to step 5204. Preferably, the values of these parameters are encoded in the function.

In the next step 54192, the first loop counter j is incremented, and in a step 54194 it is checked that the loop counter j has reached the value DomAdmMax.

If so, then the function ends, which corresponds to the end of step 5418 in FIG. 13. Otherwise, the function returns to step 54181.

Figure 15:
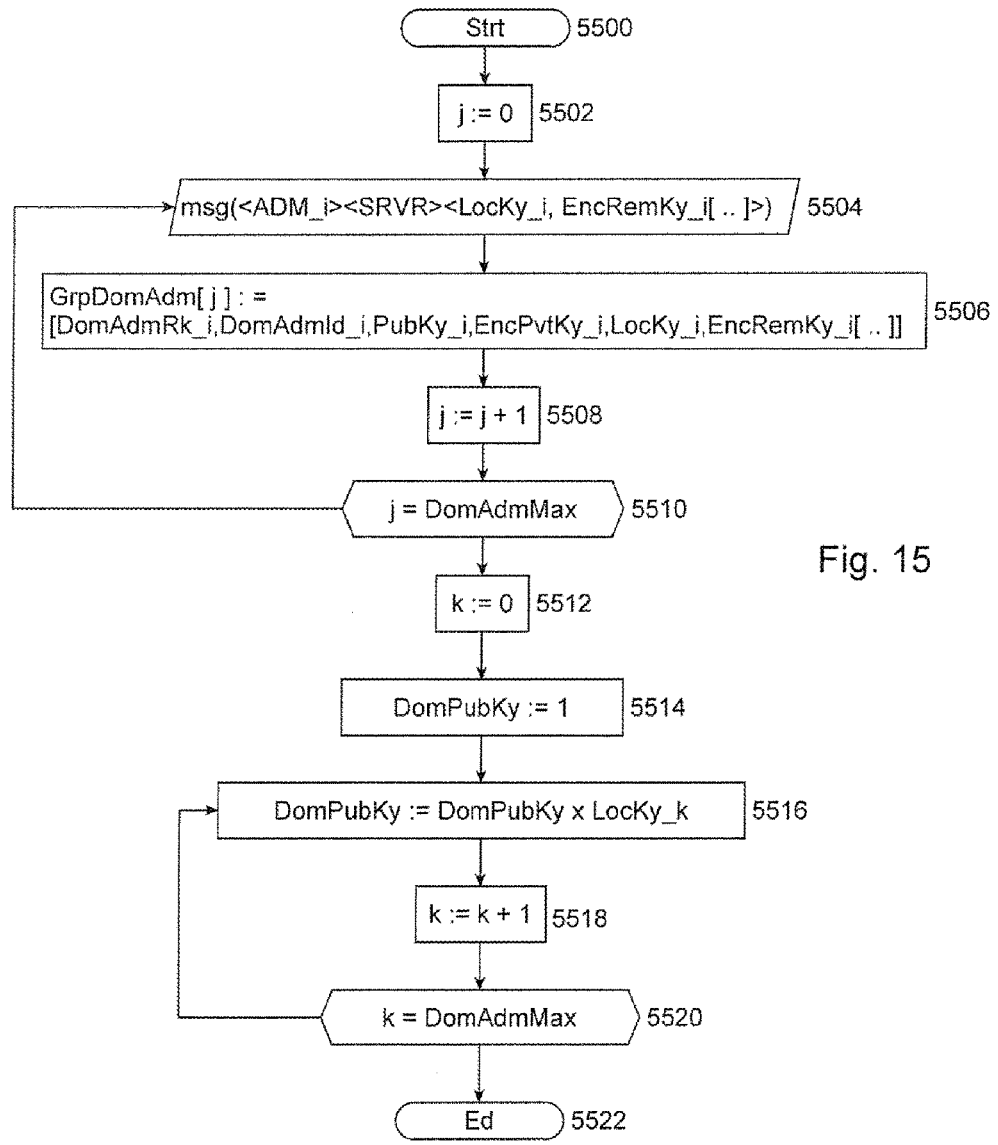
FIG. 15 represents a flowchart illustrating the operation of an escrow server corresponding to a second operational mode of an escrow domain.

FIG. 15 illustrates a third main function for a controller, e.g. the server 10 in FIG. 8, in the first operational mode of an escrow infrastructure. This third function corresponds to a phase of exchange of encryption parameters.

The function starts in a step 5500.

In the next step 5502, the function initiates a loop structure initializing a first counter j to the value 0 (zero).

In the next step 5504, the controller receives a message from an administration machine i, e.g. an ADM_SHAR message. The message contains a signature value of the administration machine i, e.g. a value LocKy_i, and an encrypted value EncRemKy_i_j of a secret value RemKy_i_j of the machine i calculated for each other administration machine j, from the integer value corresponding to the latter. Here, the encryption has been performed with the key PubKy_j of each machine j. For example, these values are assembled in an indexed array EncRemKy_i.

In the next step 5506, as an element of index j of an array GrpDomAdm a value is stored corresponding to the integer value of the machine i, e.g. the value DomAdmRk_i, an identifier of this machine, e.g. the identifier DomAdmId_i, a public key value specific to this machine, or key PubKy_i, an encrypted value of a private key value generated by this machine, e.g. the value EncPvtKy_i, the signature of this machine, or value LocKy_i, and the encrypted values EncRemKy_i of signatures generated by the machine i for each other administration machine j of the infrastructure.

In the next step 5508, the function increments the loop counter j. In the next step 5510, the function checks that the loop counter j has reached its final value, which corresponds to the number DomAdmMax. If so, then the server has received a message from each of the administration machines of the domain. Otherwise, the function returns to step 5504 where it waits for one or more messages from other administration machines.

Once the server has received and processed the messages from all of the administration machines of the infrastructure, i.e. the test in step 5510 is positive, the server starts a second loop structure initializing a second counter k to the value of 0 (zero) during a step 5512.

In the next step 5514, the server creates a calculation variable DomPubKy. The variable DomPubKy is initialized to the value of 1 (one).

During a step 5516, the old value of this variable DomPubKy is calculated as the new value of the variable DomPubKy, that is multiplied by the local public key of the administration machine k, or key LocKy_k.

The next step 5518 consists in incrementing the second loop counter k. In the next step 5520, it is checked that the loop counter k has reached its final value, which corresponds to the number DomAdmMax.

If so, then the function ends at the next step 5522. Otherwise, the function returns to 5516.

The result of steps 5514 through 5520 is a final value of the variable DomPubKy which corresponds to the product of the respective values of local key LocKy_k of each administration machine of the escrow infrastructure.

Figure 16:
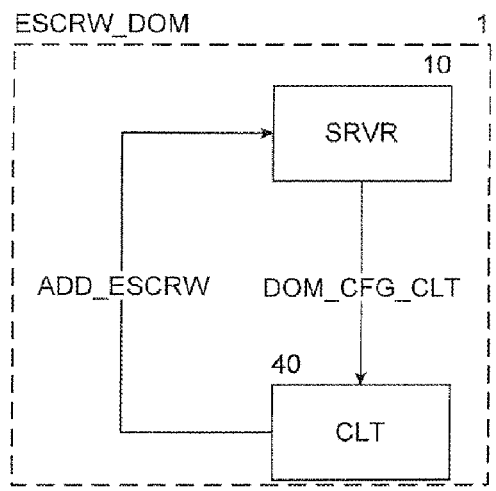
FIG. 16 represents a functional diagram illustrating the domain in FIG. 1 in a second operational mode.

FIG. 16 illustrates the escrow domain 1 in the second operational mode, which corresponds to the deposit of an escrow on the server 10 from a client machine 40.

The client machine 40 receives a message from the server comprising cryptographic parameters for use in the domain, or message DOM_CFG_CLT. These data comprise a public key value for use in the domain 1, i.e. to be used for encrypting an escrow intended for this infrastructure. This is in particular the final value of the variable DomPubKy.

The client machine 40 processes a series of bytes of any size to be escrowed with the aid of the cryptographic parameters received and local parameters, then transmits a message containing the escrow to be stored to the server 10, or message ADD_ESCRW.

The encrypted byte series is what is sometimes called a "secret" in the art. The secret may correspond to a character string, a number or a series of numbers, a file or a list of files.

FIG. 17 illustrates a main function for a client machine of an escrow infrastructure, e.g. the machine 40 in FIG. 16, in the second operational mode of the infrastructure.

The function starts in a step 700.

In the next step, 702, the function receives the secret to be processed, e.g. a character string CltScrtStrg.

In the next step, 704, the function randomly generates an integer value CltSesKy, here with the aid of a subfunction kygnrtr ( ).

In the next step 706, the function encrypts the string CltScrtStrg with the integer value CltSesKy. The function uses a symmetric type of algorithm, e.g. of the AES type. An encrypted string, or string EncCltScrtStrg, is obtained. The integer value CltSesKy corresponds to a session key for the client machine, i.e. this integer value is only used for encrypting a string CltScrtStrg or a limited number of similar strings. This value CltSesKy is specific to the client machine.

In the next step, 707, the function randomly generates a value r comprised in the interval [1 . . . p−2].

In the next step, 708, the function encrypts the session key CltSesKy with the value DomPubKy, which corresponds to a public key for the escrow domain. The function uses an encryption function of the ElGamal type, with, as parameters, the dimension p and generator g values of the infrastructure. These values may have been received from the server as cryptographic parameters or integrated directly into the function.

The encryption takes as a parameter the randomly generated integer value r as a private key.

The escrow comprises the encrypted form of the session key. The escrow comprises a first number Alpha which is the generating value g of the domain raised to the power r modulo p, and a second number Beta which corresponds more particularly to the encrypted form of the session key, calculated as the public key to the power r multiplied by the session key CltSesKy, all modulo p.

In the next step 710, the client machine transmits a message to an infrastructure controller, e.g. an ADD_ESCRW message. The message contains an identifier of the client machine, or identifier DomCltId, an escrow identifier, e.g. in the form of a string CltEscwId, and the escrow comprising the values Alpha and Beta corresponding to the encrypted value EncCltSesKy of the session key CltSesKy. As an option, the message may further contain the encrypted form EncCltScrtStrg of the string CltScrtStrg, i.e. of the secret of the client machine user. In a way, this encrypted form may be viewed as also forming part of the escrow.

The client machine is identified with the infrastructure controller in order to receive the operating parameters of the infrastructure, in particular the values of the parameters p and g and the public key. The client machine, or its user, are not necessarily authenticated. In other words, the controller does not keep any authentication data relating to the client machine or to its user.

The function then ends at step 712.

On receiving the message ADD_ESCRW, the infrastructure controller may transmit an acknowledgment to the client machine. The server stores the escrow, in particular in a cold storage server, and the data relating to the client machine.

Figure 18:
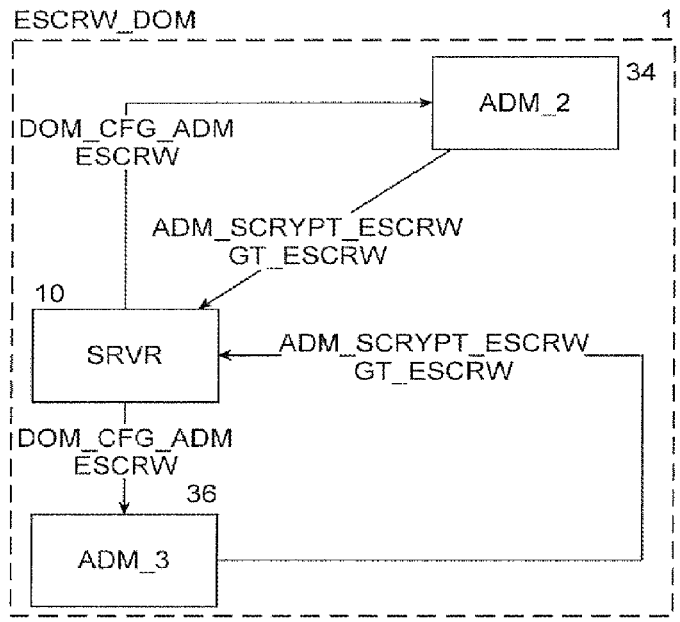
FIG. 18 represents a functional diagram illustrating the escrow domain in FIG. 1 in a third operational mode.
Figure 21:
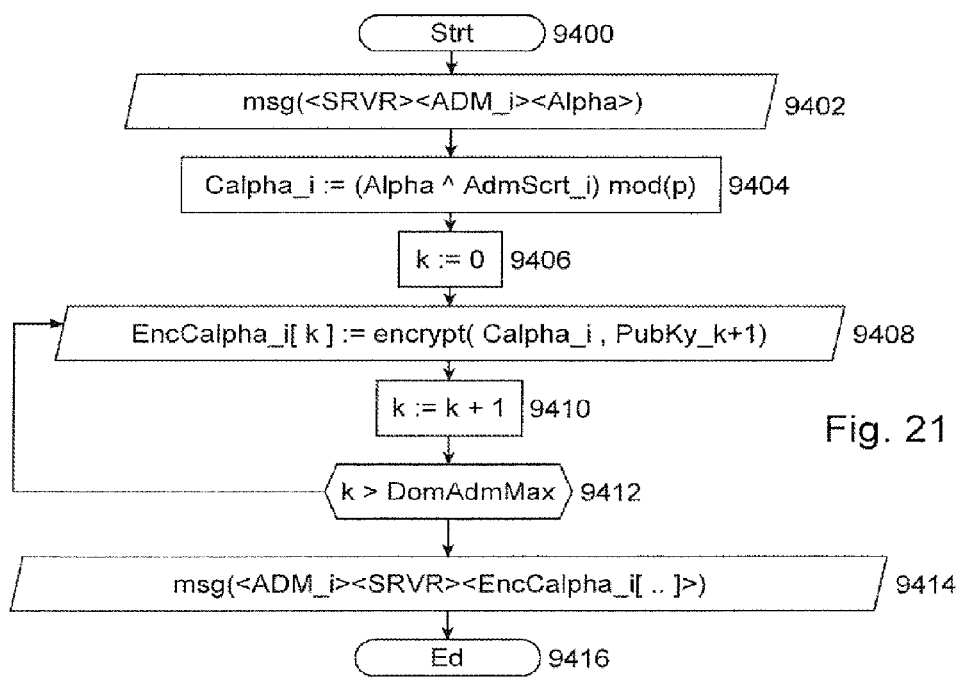
FIG. 21 is similar to FIG. 20.

FIG. 18 illustrates the third operational mode of an escrow infrastructure such as the domain 1 in FIG. 1.

In this operational mode, only a subset of the group of administration machines of the domain 1 cooperates with a view to recovering a digital escrow, e.g. the values Alpha and Beta corresponding to the encrypted form of the key CltSesKy. In the example in FIG. 18, this means the second administration machine 34 and the third administration machine 36. Each of the administration machines receives a message containing the cryptographic configuration data of the domain, or message DOM_CFG_ADM.

Figure 19:
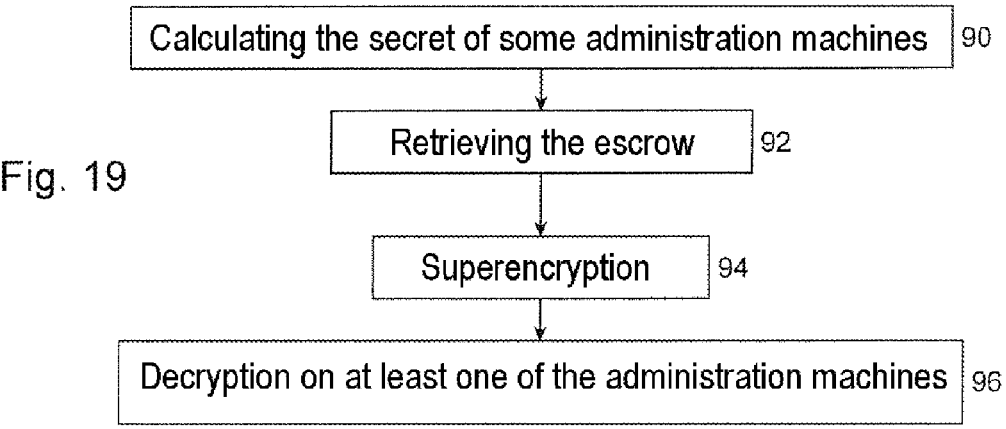
FIG. 19 represents a flowchart illustrating the third operational mode of an escrow domain.

Escrow recovery comprises four main operations. In a first operation, illustrated by block 90 in FIG. 19, at least some of the machines of the group of administration machines, here the second machine 32 and the third machine 36, each calculate a respective additional value from the cryptographic data calculated for them by all of the other administration machines of the escrow infrastructure. This additional value is secret since it is calculated for the first time on the administration machine concerned, from secret values calculated and encrypted for this administration machine.

In the next operation, represented by block 92, the escrow, or, at the very least, the value of Alpha, is retrieved.

In a next operation, represented by block 94, the administration machines which have calculated their additional secret value once again encrypt the value Alpha. The value Alpha corresponds to one part of the escrow, in particular a part of the encrypted value EncCltSesKy of the key CltSesKy. This step of encryption of the value Alpha may be seen as a superencryption.

In a next operation, represented by block 96, each administration machine having calculated an additional secret value decrypts the escrow. In other words, each of these administration machines retrieves the value of the session key CltSesKy. As an option, at least some of these machines may decrypt the secret EncCltScrtStrg.

Figure 20:
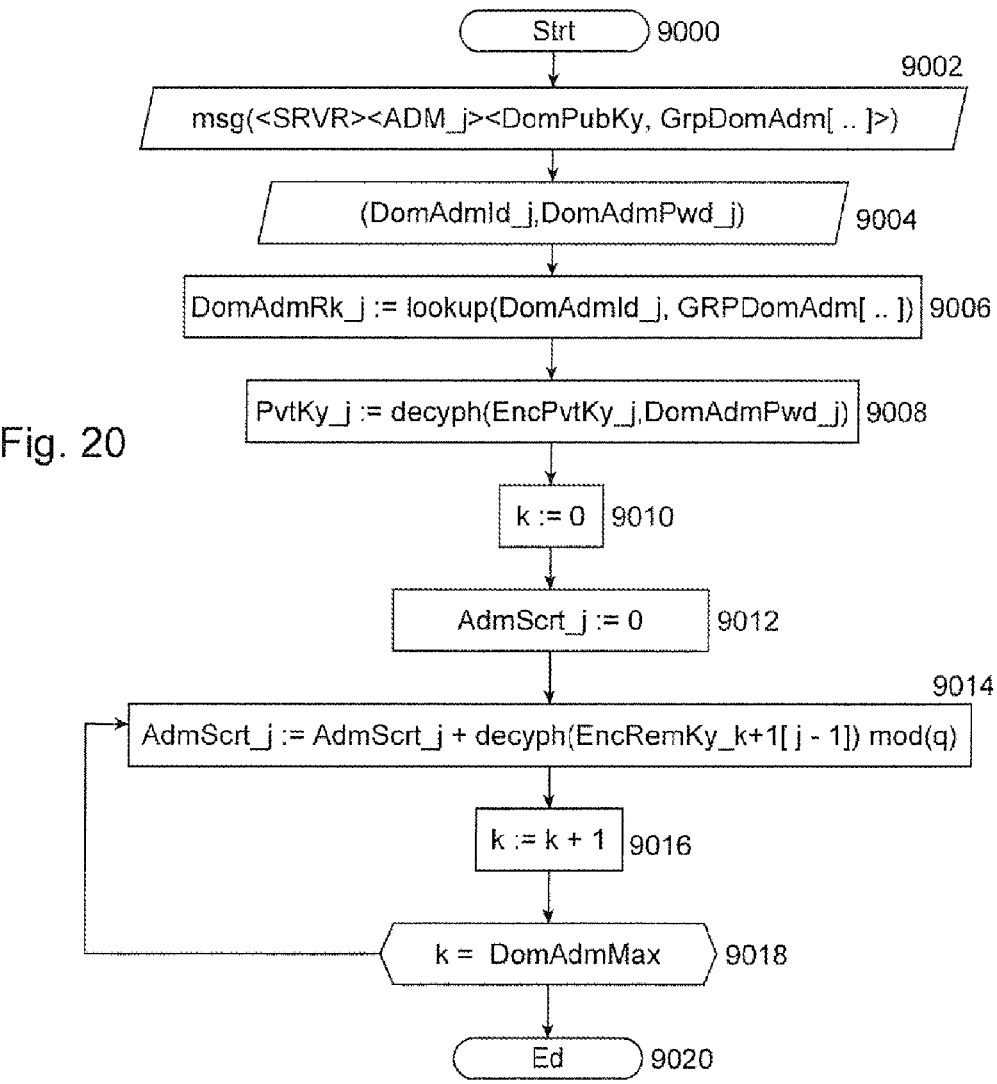
FIG. 20 represents a flowchart illustrating the operation of an administration machine corresponding to the third operational mode of an escrow domain.

FIG. 20 illustrates a second main function for an administration machine of an escrow infrastructure and intended for calculating a secret value specific to this machine, denoted generically administration machine j, or machine DomAdm_j.

The function starts in a step 9000.

In the next step 9002, the function receives a message from an infrastructure controller containing a public key value for use in the infrastructure, e.g. the key DomPubKy, and the data relating to cryptographic parameters of the infrastructure, e.g. grouped in an array of the GrpDomAdm array type. This is, for example, a DOM_CFG_ADM message. The cryptographic parameters comprise in particular all of the secret values calculated by each administration machine i for the other administration machines j of the group of administration machines. Here, each secret value is encrypted with the public key of the administration machine for which it is intended, i.e. the integer value of which has been used for the calculation.

In the next step 9004, the function receives a code which determines access to the administration machine j, e.g. a string similar to the string DomAdmPwd_j.

In the next step 9006, the function searches in the cryptographic parameters of the infrastructure for the integer value DomAdmRk_j corresponding to an administration machine j.

In the next step, 9008, the function decrypts the value EncPvtKy_j of the machine j thanks to the password DomAdmPwd_j entered in step 9004. The result is a private key value corresponding to the administration machine j, or key PvtKy_j.

Steps 9004 through 9008 are optional. They are aimed at retrieving the key value PvtKy_i of the machine i, as it was calculated at the initialization of the escrow domain.

In the next step 9010, the function starts a loop structure by initializing a counter k to the value 0 (zero).

In the next step 9012, the function creates a calculation variable AdmScrt_j for the administration machine j which it sets to the value zero.

In the next step 9014, the function attributes to the calculation variable AdmScrt_j the previous value of this variable to which it adds the decrypted version of the secret value calculated by the administration machine k for the administration machine j. Here, this value corresponds to the element of index j−1 of the array EncRemky_k+1.

In the next step 9016, the function increments the counter k.

In the next step 9018, the function checks that the counter k has reached its final value, which corresponds to the number DomAdmMax. If so, then the function ends at the next step 9020. Otherwise, the function returns to step 9014.

The resulting value AdmScrt_j corresponds to an additional secret value of the administration machine j calculated from the secret values calculated for this machine j by the other administration machines of the infrastructure.

In a phase not detailed, at least some of administration machines send a message with identifiers corresponding to the escrows, e.g. a user name and an escrow name. This is, for example, a GET_ESCRW message. In return, an escrow controller is arranged for sending back the value Alpha to these administration machines.

Figure 22:
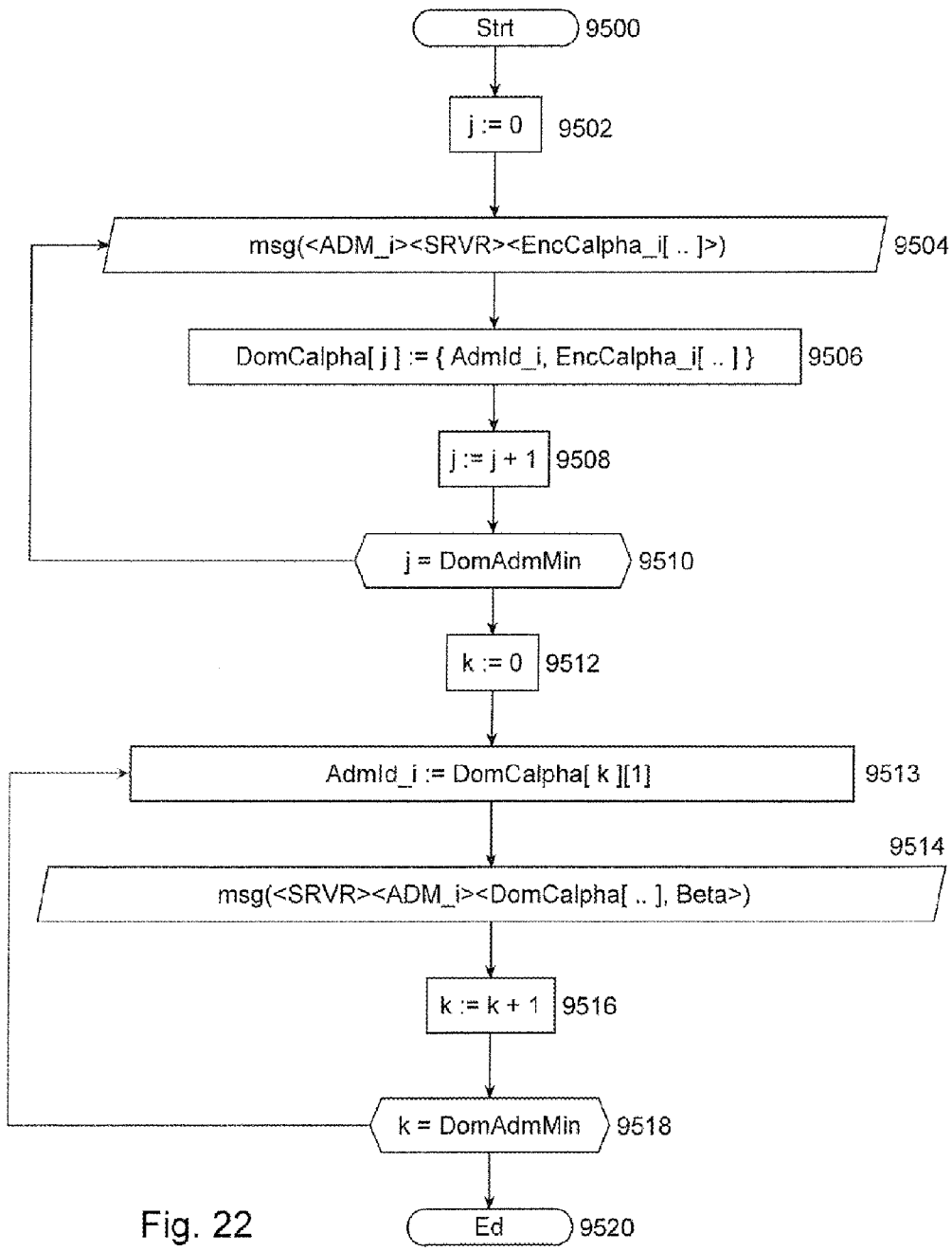
FIG. 22 represents a flowchart illustrating the operation of an escrow server corresponding to the third operational mode of an escrow domain.

FIG. 22 illustrates a second main function for an administration machine of an escrow infrastructure in the third operational mode of this infrastructure, e.g. one of the second machine 34 and the third machine 36 in FIG. 18. It involves once again encrypting a part of the escrow, the value Alpha, with a secret value specific to the administration machine and established from secret values calculated for it by the homologous machines of the group of administration machines.

The function starts in a step 9400.

In the next step 9402, the function receives a message comprising the value Alpha corresponding to a part of a digital escrow. Typically, it is a part of the encrypted value EncCltSesKy of the session key CltSesKy.

In the next step 9404, the function calculates an encrypted value EncCalpha_i of the value Alpha with an additional secret value AdmScrt_i of the machine i. The function raises the value Alpha to a power corresponding to the additional secret value AdmScrt_i of the machine i, all modulo p.

In the next step 9406, the function initiates a loop structure by initializing a counter k to the value 0 (zero).

In the next step 9408, the function calculates an encrypted value of the value EncCalpha_i by using the key PubKy_k+1 corresponding to the administration machine k+1. The result is, for example, stored as an element of index k of an array, denoted here as array EncCalpha_i.

In the next step 9410, the function increments the loop counter k.

In the next step 9412, the function checks that the loop counter k has reached its final value, which corresponds to the number DomAdmMax.

If so, then the function passes on to the next step 9414. Otherwise, the function returns to step 9408.

At the end of steps 9406 through 9412, the function has established a collection of encrypted values each corresponding to the value EncAlpha_i of Alpha encrypted with the additional secret value of the machine i encrypted again with the public key PubKy_k of another administration machine k of the infrastructure. These steps are intended to encrypt the exchange of the values EncAlpha_i each specific to a respective administration machine of the infrastructure between the administration machines i across the infrastructure. These steps are optional.

In step 9414, the administration machine i constructs a message to the controller of the infrastructure, e.g. an ADM_SCRYPT_ESCRW message. The message comprises the collection of values EncCalpha_i_k, e.g. in the form of an indexed list EncAlpha_i of values a generic element of which of index k comprises a value EncAlpha_i encrypted with the key PubKy_k corresponding to the index value.

The function then ends at step 9416.

FIG. 22 illustrates a third main function for an escrow infrastructure controller such as the server 10 in FIG. 18 in the third operational mode of this infrastructure.

The function starts with a step 9500.

In the next step 9502, the function initiates a loop structure by initializing a counter j to the value 0 (zero).

In the next step 9504, the server receives a message from an administration machine i. The message comprises the collection of values of Alpha encrypted by the machine i encrypted for each other administration machine of the escrow infrastructure. Here these values are assembled into an array of the EncCalpha_i [ . . . ] array type.

In the next step, 9506, the function creates an array intended to contain the encrypted values of Alpha for the domain, or array DomCalpha. The function stores therein the collection of values calculated by the administration machine i, or array EnCalpha_j as an element of index j, here in relation to an identifier of this machine, e.g. the identifier AdmId_i In the next step 9508, the function increments the loop counter j.

In the next step 9510, the function checks that the loop counter j has reached its final value, which corresponds to the number DomAdmMin.

If so, then the function has received and processed as many messages as the minimum number of administration machines for recovering an escrow. The function then continues with step 9512. Otherwise, the function returns to step 9504.

In step 9512, the function initiates a loop structure by initializing a second counter k to the value 0 (zero).

In the next step 9513, the function retrieves an identifier of the machine the calculated data of which are stored as an element of index k in the array DomCalpha. This identifier is that of the administration machine i, generically denoted by AdmId_i.

In the next step 9514, the function orders a message to be transmitted to the administration machine k. The message contains the array DomCalpha and the value Beta.

In the next step 9516, the function increments the second loop counter k.

In the next step 9518, the function checks that the counter k has reached its final value, namely the number DomAdmMin.

If so, then the function has issued a message to each administration machine involved in the recovery of an escrow. And the function ends at the next step 9520. Otherwise, the function returns to step 9513 for transmitting a message to another administration machine of the escrow.

Figure 23:
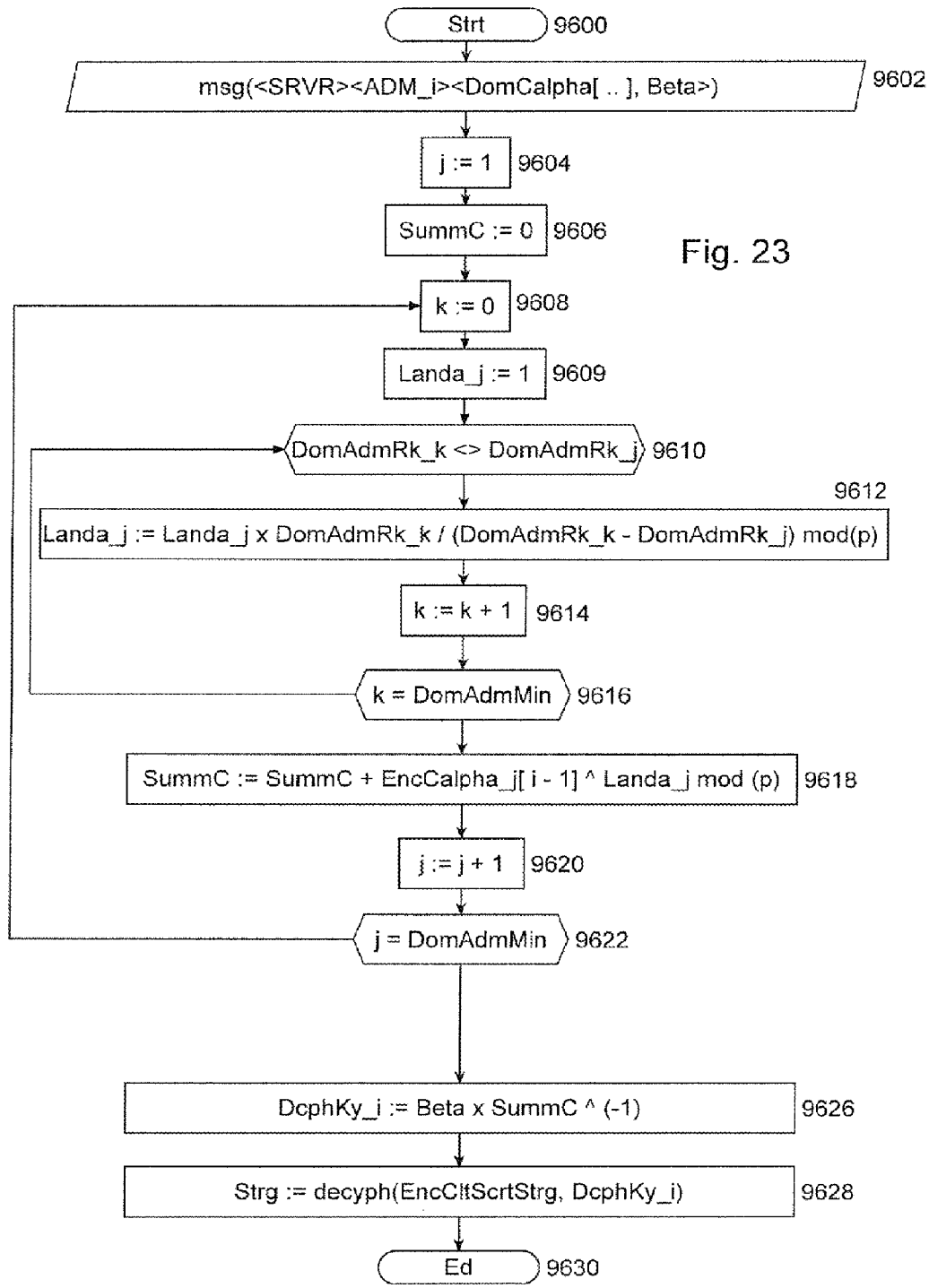
FIG. 23 represents a flowchart illustrating the operation of an administration machine corresponding to the third operational mode of an escrow domain.

FIG. 23 illustrates a second function for an administration machine for use in the decryption of the escrow.

The function starts with a step 9600.

In the next step 9602, the function receives a message from a controller of an escrow infrastructure, e.g. the server 10 in FIG. 18, containing a set of values of Alpha encoded with the secret values of the administration machines of the escrow, each value being itself encrypted with a public key value of an administration machine. Here these values are contained in an array of the DomCalpha array type. The message may further comprise the Beta part of the digital escrow.

In the next step 9604, the function initiates a loop structure by initializing a first counter j to the value 1 (one).

In the next step 9606, the function creates a calculation variable SummC which it initializes to the value zero.

In the next step 9608, the function starts a second loop structure, nested in the first, by initializing a second counter k to the value 0 (zero).

In the next step 9609, the function initializes a second calculation variable, or variable Lambda_j to the value 1 (one).

In the next step 9610, the function checks that the integer value DomAdmRk_k of the machine k differs from that of DomAdmRk_j of the administration machine DomAdm_j. If so, then the function calculates a value Lambda_j by multiplying the previous value of the variable Lambda_j by the integer value DomAdmRk_k corresponding to the machine DomAdm k and by dividing the result by the value of the difference of the integer value DomAdmRk_k corresponding to the administration machine k and to that DomAdmRk_j corresponding to the machine DomAdm_j, all modulo p.

In the next step 9614, the function increments the second loop counter k.

In the next step 9616, the function checks that the loop counter k has reached its final value, which corresponds to the number DomAdmMin. If so, then the function continues with step 9618. Otherwise, the function returns to step 9610.

Steps 9608 through 9616 correspond to the calculation of a Lagrange coefficient value from the integer values DomAdmRk corresponding to the administration machine k and to the homologous administration machines of at least one subset of the group of administration machines.

In step 9618, the function calculates SummC as the previous value of the variable SummC to which it adds the value EncCalpha of Alpha encrypted for the administration machine i to the power Lambda_j.

In the next step 9620, the function increments the loop counter j.

In the next step 9622, the function checks that the loop counter j has reached its final value, which corresponds to the number DomAdmMin. If so, then the function continues with step 9626. Otherwise, the function returns to step 9608.

In the next step 9626, the function calculates a decrypted version DcphKy_i of Beta for the administration machine i. This value is calculated by multiplying the value Beta by the last calculated value of the variable SummC to the power of minus one (−1).

In the next step 9628, the function retrieves the secret value of the user CltScrtStrg by decrypting the encrypted version EncCltScrtStrg with the aid of the decryption key DcphKy_i. This decryption key DcphKy_i corresponds to the integer value used for the symmetric encryption of the secret to be processed, e.g. the value CltSesKy described in relation to FIG. 17.

Then the function ends at the next step 9630.

Steps 9600 through 9630 may be performed on each of the administration machines of the escrow of the quorum, i.e. of the machines having calculated a superencrypted version of Alpha.

Decryption involves a subset of administration machines of the domain the cardinal of which corresponds to the number DomAdmMin. The number DomAdmMin is defined as a parameter. It resembles what could be called a "quorum" of administration machines.

In this process of decryption, the storage server of the escrow acts mainly to make the different parts Alpha and Beta of the escrow available to the administration machines of the quorum.

In a variant embodiment, the administration machines are arranged for recovering only the session key of the client machine, and for communicating this value to the client machine.

An escrow infrastructure has just been described in which administration machines are occupied with the recovery of digital escrows and a part of the initialization of this infrastructure. A machine comprises the hardware and software necessary for the operation described. In particular, the software elements may be common to at least some of the administration machines. The administration machines are essentially distinguished from each other by their identifier DomAdmId in the infrastructure. The identifier of an administration machine may be replaced by a user identifier insofar as the controller is capable of relating a user identifier with an address for the messages, or, similarly by a software identifier.

The control of access to an administration machine is subject to the provision of a code. In practice, this code may be associated with a more easily memorable equivalent for the user. The equivalent in question may take a variety of forms, such as a computer file, a certificate, or a "token" as it is known in the art, optionally stored on memory media such as a smart card, for example. The equivalent may also correspond to biometric parameters of a person, such as digital fingerprints, for example.

The controller or the escrow server may provide the parameters of the cryptographic function for use in the domain.

The escrow server is arranged for storing an escrow comprising the values Alpha and Beta of an ElGamal cipher, corresponding to a symmetric encryption key and as an option the symmetrically encrypted form of a secret. As a variant, the server may only store a part of this escrow, e.g. the values Alpha and Beta. The server described fulfills a dual function, namely (i) keeping users' secrets in encrypted form, (ii) keeping the encryption keys used on the users' secrets with access, in encrypted form. The user may decrypt their secret if they know the value of the encryption key. Otherwise, it may require the recovery of this key from its asymmetrically encrypted form. Recovery implies that a predetermined number of administration machines, or quorum, accesses the encrypted form of the encryption key. It is the server that gives access to this encrypted form. Physically, the server may correspond to a machine dedicated to this function or a machine further fulfilling other functions within the infrastructure, e.g. one of the administration machines.

The exchanges of cryptographic data between administration machines, in particular the secret values, the secret keys or the escrow, take place here by message exchanges which are centralized on the escrow controller. This centralized architecture of the infrastructure may be relinquished in favor of an architecture in which at least some of the messages are directly exchanged between machines of the group of administration machines. In the preceding description, most messages sent by the server to a respective administration machine contain data that only concern other administration machines. The confidentiality of these data is ensured by the use of an encryption with the aid of the public key of the administration machine concerned by the data. As a variant, the server sends to each administration machine only the data that concern this machine.

Homologous administration machines, i.e. which are capable of operating, with regard to the infrastructure, in a similar way to each other, have been described. Homologous administration machines may materially differ from each other. In one currently preferred embodiment, each administration machine results from the same computer program product running on a central computer unit. However, it is conceivable that at least some of the administration machines may be distinguished from each other by the product in question.

Administration or client machines have been described notably that store a set of parameters relating to an encryption function for the operation of the infrastructure of an escrow. This storage is to be understood here in a broad sense, encompassing, for example, parameters incorporated in the program corresponding to the product running on a central computer unit, or a temporary storage, limited to the duration necessary for the encryption/decryption/recovery calculations.

The invention has been described in the form of an escrow infrastructure notably comprising one or more administration machines. It may take the form of a method for administering an escrow server.

The infrastructure described, or its variants, exhibit the following features:

For retrieving the confidential data of the escrow, a malicious person must corrupt the whole of the quorum of administration machines.

The infrastructure operates without a master key. No decryption key is reconstructed. Each administration machine superencrypts at least one part of the escrow with a secret value that is specific thereto.

If the infrastructure is corrupted, there would be no disclosure of information concerning the administration machines or the users of these machines, nor regarding the secrets kept by the infrastructure in question.

Only a subset of the administration machines may recover the escrow. These machines or their users do not need to know the identity of the ones or the others.

The escrow server, or the controller, does not hold any temporary or partial key useful for the recovery of an escrow. No secret key is available on the server, either in memory, or in a file. The server only holds encrypted digital data, without any element making their decryption possible.

All the cryptographic operations, including the random generation of encryption parameters, are performed in a distributed manner on machines separate from the escrow server/controller. The escrow is encrypted on the client machine.

No user of the infrastructure may recover their secret alone, i.e. without the participation of a quorum of administration machines. This avoids any theft of secret by identity theft.

The client machines, administration machines and/or higher level administration machines may be implemented in the form of the same software, or computer program product, running on one or more computer devices, typically a central computer unit. The function of the resulting machine in the escrow infrastructure may be determined by identification data relating to the user, e.g. an identifier/password pair. In this case, the identification data are associated, for example, in the escrow controller, with a function such as an administrator or super administrator. This does not necessarily apply to the client machine, insofar as its user, i.e. the infrastructure client, does not have to be authenticated.

The infrastructure operates with a public key for encrypting escrows. No private key is associated with this public key. Recovery is based on a superencryption with the aid of a shared secret in the manner of Shamir.

The messages exchanged between machines of the infrastructure and the server/controller are encrypted. To do this, each machine initially randomly generates an encryption key pair in an asymmetric protocol. Each machine possesses the public key of the server/controller, in particular encoded in the program the executable product of which is used for the implementation of the machine.

The invention is not limited to the embodiments described above, but encompasses all the variants that could be envisaged by the person skilled in the art.

Optional, complementary, or replacement features of the administration machine according to the invention are set out below:

The recovery function is further arranged for, in response to a message comprising at least one part of a digital escrow, calculating, with the resulting secret specific to the administration machine, an encrypted version of this part of the digital escrow, constructing at least one message comprising this encrypted version of the part of the digital escrow, and, in response to at least one message comprising encrypted versions of the part of the digital escrow, calculated with at least some of the resulting secret values specific to the homologous administration machines of the group of administration machines, recovering the escrow with the aid of at least some of these encrypted versions.

The at least one of the first secret values, corresponding to an integer value corresponding to a homologous administration machine of the group of administration machines, is comprised in the message or messages in an encrypted form with a public key value corresponding to this homologous administration machine.

The recovery function is arranged for calculating, for each homologous administration machine of at least one subset of the group of administration machines, a Lagrange coefficient value from the integer values corresponding to the administration machine and to the homologous administration machines of the subset, and for applying this Lagrange coefficient value to the encrypted version of the part of the digital escrow calculated with the resulting secret value specific to this homologous administration machine.

The recovery function is further arranged for processing the part of the digital escrow with the aid of a value corresponding to the sum of the encrypted versions of the part of the digital escrow calculated respectively with the resulting secret values specific to the homologous administration machines of said subset, each time raised to a power corresponding to a respective Lagrange coefficient value.

The digital escrow results from an ElGamal encryption type, the public key of which corresponds to a product of public keys each calculated with the aid of a respective integer value corresponding to the homologous administration machines of the group of administration machines.

The invention claimed is:

1. An administration machine for a digital escrow server comprising:
   at least one communication interface;
   memory storing:
      a list of integer values each corresponding to a respective machine of a group of administration machines of the digital escrow server,
      a set of parameters relating to an encryption function for creating an escrow;
   a calculator capable of executing:
      a polynomial function of a degree less than or equal to the number of machines of the group of administration machines, the polynomial function being specific to the administration machine,
   an initialization function arranged for:
      calling the polynomial function with each integer value of the list for obtaining an ordered list of first secret values,
      constructing at least one message (ADM_SHAR) comprising, for each homologous administration machine of the group of administration machines, at least the first secret value corresponding to the integer value of this homologous administration machine,
      in response to at least one message (GET_DOM_CFG), comprising, for each homologous administration machine of the group of administration machines, at least one second secret value obtained from calling the polynomial function of this homologous administration machine on the integer value of the administration machine, constructing a resulting secret value specific to the administration machine from the first and second secret values,
   a recovery function arranged for processing at least one part of a digital escrow by using the resulting secret value specific to the administration machine and resulting secret values specific to the homologous administration machines of the group of administration machines.

2. The machine as claimed in claim 1, in which the recovery function is further arranged for:
   in response to a message comprising at least one part of a digital escrow, calculating, with the resulting secret value specific to the administration machine, an encrypted version of this part of the digital escrow,
   constructing at least one message (ADM_SCRYPT_E-SCRVV) comprising this encrypted version of the part of the digital escrow, and
   in response to at least one message (DOM_CFG_ADM) comprising encrypted versions of the part of the digital escrow, calculated with at least some of the resulting secret values specific to the homologous administration machines of the group of administration machines, recovering the escrow with the aid of at least some of these encrypted versions.

3. The machine as claimed in claim 1, in which the initialization function is arranged for:
   calculating a public key value from a constant value of the polynomial function, and constructing at least one message (DOM_CFG_CLT) comprising this public key value.

4. The machine as claimed in claim 1, in which the at least one of the first secret values, corresponding to an integer value corresponding to a homologous administration machine of the group of administration machines, is comprised in the message or messages (ADM_SHAR; GET_DOM_CFG) in an encrypted form with a public key value corresponding to this homologous administration machine.

5. The machine as claimed in claim 1, in which the recovery function is arranged for processing the part of the digital escrow which corresponds to value Alpha of an ElGamal type of encryption.

6. The machine as claimed in claim 1, in which the recovery function is arranged for calculating, for each homologous administration machine of at least one subset of the group of administration machines, a Lagrange coefficient value from the integer values corresponding to the administration machine and to the homologous administration machines of the subset, and for applying this Lagrange coefficient value to the encrypted version of the part of the digital escrow calculated with the resulting secret value specific to this homologous administration machine.

7. The machine as claimed in claim 6, in which the recovery function is further arranged for processing the part of the digital escrow with the aid of a value corresponding to the sum of the encrypted versions of the part of the digital escrow calculated respectively with the resulting secret values specific to the homologous administration machines of said subset, each time raised to a power corresponding to a respective Lagrange coefficient value.

8. The machine as claimed in claim 1, in which the digital escrow results from an ElGamal encryption type, the public key of which corresponds to a product of public keys each calculated with the aid of a respective integer value corresponding to the homologous administration machines of the group of administration machines.

9. The machine as claimed in claim 1, comprising a random number generation function, in which the initialization function is arranged for repeatedly calling the random number generation function for establishing at least some of the coefficients of the polynomial function, prior to calling the latter.

10. The machine as claimed in claim 1, in which the polynomial function exhibits a degree less than the number of machines of the group of administration machines.

11. An infrastructure for exchanging and processing digital escrows comprising an escrow server and a group of administration machines comprising at least two administration machines as claimed in claim 1 for the escrow server, the two administration machines being homologous with each other.

12. The infrastructure as claimed in claim 11, in which a public key value for depositing digital escrows results from public key values each corresponding to an integer value corresponding to a respective administration machine of the group of administration machines.

13. The infrastructure as claimed in claim 11, comprising a client machine comprising at least one communication interface, memory storing at least one piece of secret digital data, and a calculator capable of executing an encryption function arranged for randomly generating a local key and for symmetrically encrypting the secret piece of digital data by using the local key.

14. The infrastructure as claimed in claim 13, in which the client machine stores a set of parameters relating to an encryption algorithm for creating an escrow and in which the encryption function of the client machine is arranged for constructing a message comprising the local key encrypted in accordance with said set of parameters.

15. A method for administering a digital escrow server comprising:

on each machine of a group of administration machines, calling a respective polynomial function of a degree less than or equal to the number of machines of the group of administration machines with each value of a list of integer values each corresponding to a respective machine of the group of administration machines for obtaining a list of secret values, on each machine of the group of administration machines, constructing at least one message comprising at least one secret value corresponding to the integer value of a recipient administration machine, on each machine of the group of administration machines, constructing a resulting secret value specific to this machine from the secret values calculated, by the other machines of the group of administration machines, for the integer value corresponding to the administration machine, on at least some of the machines of the group of administration machines, decrypting a digital escrow by using this resulting secret value and the resulting secret values of homologous administration machines.

16. A computer program product embodied on a non-transitory computer readable medium and executable by a central computer unit to form an administration machine comprising:

at least one communication interface;

a memory storing:

a list of integer values each corresponding to a respective machine of a group of administration machines of the digital escrow server, and a set of parameters relating to an encryption function for creating an escrow;

a calculator capable of executing:

a polynomial function of a degree less than or equal to the number of machines of the group of administration machines, the polynomial function being specific to the administration machine, an initialization function arranged for:

calling the polynomial function with each integer value of the list for obtaining an ordered list of first secret values, constructing at least one message (ADM_SHAR) comprising, for each homologous administration machine of the group of administration machines, at least the first secret value corresponding to the integer value of this homologous administration machine, in response to at least one message (GET_DOM_CFG), comprising, for each homologous administration machine of the group of administration machines, at least one second secret value obtained from calling the polynomial function of this homologous administration machine on the integer value of the administration machine, constructing a resulting secret value specific to the administration machine from the first and second secret values, and a recovery function arranged for processing at least one part of a digital escrow by using the resulting secret value specific to the administration machine and resulting secret values specific to the homologous administration machines of the group of administration machines.

\* \* \* \* \*